United States Patent
Natanzon et al.

(10) Patent No.: US 8,332,687 B1
(45) Date of Patent: Dec. 11, 2012

(54) SPLITTER USED IN A CONTINUOUS DATA PROTECTION ENVIRONMENT

(75) Inventors: Assaf Natanzon, Ramat-Gan (IL); Arich Don, Newton, MA (US); Saar Cohen, Moshav Mishmeret (IL); Slavik Neymer, Petah Tikva (IL); David Meiri, Cambridge, MA (US); Brian Riordan, West Newton, MA (US); Anestis Panidis, Weston, MA (US); Xiali He, Upton, MA (US)

(73) Assignee: EMC Corporation, Hopkinton, MA (US)

( * ) Notice: Subject to any disclaimer, the term of this patent is extended or adjusted under 35 U.S.C. 154(b) by 258 days.

(21) Appl. No.: 12/821,418

(22) Filed: Jun. 23, 2010

(51) Int. Cl.
  *G06F 11/00* (2006.01)

(52) U.S. Cl. ......... 714/6.3; 709/202; 709/203; 709/204; 714/6.2; 714/6.31; 714/6.32

(58) Field of Classification Search ........... 707/999.202, 707/999.203, 999.204; 714/6.2, 6.3, 6.31, 714/6.32
  See application file for complete search history.

(56) References Cited

U.S. PATENT DOCUMENTS

| | | | |
|---|---|---|---|
| 5,170,480 A | 12/1992 | Mohan et al. | |
| 5,388,254 A | 2/1995 | Betz et al. | |
| 5,499,367 A | 3/1996 | Bamford et al. | |
| 5,592,618 A * | 1/1997 | Micka et al. | 714/54 |
| 5,864,837 A | 1/1999 | Maimone | |
| 5,990,899 A | 11/1999 | Whitten | |
| 6,065,018 A | 5/2000 | Beier et al. | |
| 6,148,340 A | 11/2000 | Bittinger et al. | |
| 6,260,125 B1 | 7/2001 | McDowell | |
| 6,272,534 B1 | 8/2001 | Guha | |
| 6,467,023 B1 | 10/2002 | DeKoning et al. | |
| 6,574,657 B1 | 6/2003 | Dickinson | |
| 6,621,493 B1 | 9/2003 | Whitten | |
| 6,782,401 B2 * | 8/2004 | Winokur | 1/1 |
| 6,804,676 B1 | 10/2004 | Bains, II | |
| 6,947,981 B2 | 9/2005 | Lubbers et al. | |
| 7,043,610 B2 | 5/2006 | Horn et al. | |
| 7,076,620 B2 | 7/2006 | Takeda et al. | |
| 7,111,197 B2 | 9/2006 | Kingsbury et al. | |
| 7,117,327 B2 | 10/2006 | Hirakawa et al. | |
| 7,120,768 B2 | 10/2006 | Mizuno et al. | |
| 7,130,975 B2 | 10/2006 | Suishu et al. | |
| 7,139,927 B2 | 11/2006 | Park et al. | |
| 7,159,088 B2 | 1/2007 | Hirakawa et al. | |
| 7,167,963 B2 | 1/2007 | Hirakawa et al. | |

(Continued)

FOREIGN PATENT DOCUMENTS

EP 1154356 11/2001

(Continued)

OTHER PUBLICATIONS

Microsoft Computer Dictionary, 2002 Press Fifth Edition, p. 58.

(Continued)

*Primary Examiner* — Joshua P Lottich
(74) *Attorney, Agent, or Firm* — Daly, Crowley, Mofford & Durkee, LLP

(57) ABSTRACT

In one aspect, a method includes providing a splitter at a first storage array, receiving data from a host, storing the data on the first storage array, using a data protection appliance (DPA) to expose a device, continuously copying data stored on the first storage array to the device using the splitter and replicating the data to a second storage array using the DPA.

19 Claims, 33 Drawing Sheets

U.S. PATENT DOCUMENTS

| | | | |
|---|---|---|---|
| 7,222,136 | B1 | 5/2007 | Brown et al. |
| 7,296,008 | B2 | 11/2007 | Passerini et al. |
| 7,360,113 | B2 | 4/2008 | Anderson et al. |
| 7,426,618 | B2 | 9/2008 | Vu et al. |
| 7,516,287 | B2 | 4/2009 | Ahal et al. |
| 7,519,625 | B2 | 4/2009 | Honami et al. |
| 7,519,628 | B1 | 4/2009 | Leverett |
| 7,546,485 | B2 | 6/2009 | Cochran et al. |
| 7,577,867 | B2 | 8/2009 | Lewin et al. |
| 7,606,940 | B2 | 10/2009 | Yamagami |
| 7,627,612 | B2 | 12/2009 | Ahal et al. |
| 7,627,687 | B2 | 12/2009 | Ahal et al. |
| 7,757,057 | B2 | 7/2010 | Sangapu et al. |
| 7,774,565 | B2 | 8/2010 | Lewin et al. |
| 7,908,447 | B2 * | 3/2011 | Suzuki et al. .................. 711/162 |
| 2002/0129168 | A1 | 9/2002 | Kanai et al. |
| 2003/0061537 | A1 | 3/2003 | Cha et al. |
| 2003/0110278 | A1 | 6/2003 | Anderson |
| 2003/0196147 | A1 | 10/2003 | Hirata et al. |
| 2004/0205092 | A1 | 10/2004 | Longo et al. |
| 2004/0250032 | A1 | 12/2004 | Ji et al. |
| 2004/0254964 | A1 | 12/2004 | Kodama et al. |
| 2005/0015663 | A1 | 1/2005 | Armangau et al. |
| 2005/0028022 | A1 | 2/2005 | Amano |
| 2005/0049924 | A1 | 3/2005 | DeBettencourt et al. |
| 2005/0172092 | A1 | 8/2005 | Lam et al. |
| 2005/0273655 | A1 | 12/2005 | Chow et al. |
| 2006/0031647 | A1 | 2/2006 | Hirakawa et al. |
| 2006/0047996 | A1 | 3/2006 | Anderson et al. |
| 2006/0064416 | A1 | 3/2006 | Sim-Tang |
| 2006/0107007 | A1 | 5/2006 | Hirakawa et al. |
| 2006/0117211 | A1 | 6/2006 | Matsunami et al. |
| 2006/0161810 | A1 | 7/2006 | Bao |
| 2006/0195670 | A1 | 8/2006 | Iwamura et al. |
| 2006/0212462 | A1 | 9/2006 | Heller et al. |
| 2007/0055833 | A1 | 3/2007 | Vu et al. |
| 2007/0162513 | A1 * | 7/2007 | Lewin et al. .................. 707/200 |
| 2007/0180304 | A1 | 8/2007 | Kano |
| 2007/0198602 | A1 | 8/2007 | Ngo et al. |
| 2007/0198791 | A1 | 8/2007 | Iwamura et al. |
| 2007/0220311 | A1 * | 9/2007 | Lewin et al. ...................... 714/6 |
| 2007/0266053 | A1 * | 11/2007 | Ahal et al. .................... 707/200 |
| 2008/0082591 | A1 * | 4/2008 | Ahal et al. .................... 707/204 |
| 2008/0082592 | A1 * | 4/2008 | Ahal et al. .................... 707/204 |
| 2008/0082770 | A1 * | 4/2008 | Ahal et al. .................... 711/162 |
| 2009/0328229 | A1 * | 12/2009 | Fashchik et al. ................ 726/26 |

FOREIGN PATENT DOCUMENTS

| | | | |
|---|---|---|---|
| WO | WO 00 45581 A3 | 8/2000 | |

OTHER PUBLICATIONS

Soules et al.; "Metadata Efficiency in a Comprehensive Versioning File System", May 2002, CMU-CS-02-145, School of Computer Science, Carnegie Mellon University, Pittsburgh, PA 15213, 33 pages.

Office Action dated Dec. 21, 2011, U.S. Appl. No. 12/045,946, 14 pages.

Office Action dated Jan. 23, 2012, U.S. Appl. No. 12/818,236, 17 Pages.

Gibson, Five Point Plan Lies at the Heart of Compression Technology, Apr. 29, 1991, p. 1.

Soules, Metadata Efficiency in Versioning File Systems, 2003, pp. 1-16.

AIX System Management Concepts: Operating Systems and Devices May 2000, pp. 1-280.

U.S. Appl. No. 11/609,560, filed Dec. 26, 2007, U.S. Patent No. 7,774,565 Issued on Aug. 10, 2010, file through Mar. 1, 2012, 265 pages.

U.S. Appl. No. 12/057,652, filed Mar. 28, 2008, file downloaded Mar. 1, 2012, 296 pages.

U.S. Appl. No. 11/609,561, filed Dec. 12, 2006, U.S. Patent No. 7,849,361 Issued Dec. 7, 2010, file downloaded Mar. 1, 2012, 214 pages.

U.S. Appl. No. 11/356,920, filed Feb. 17, 2006, U.S. Patent No. 7,577,867 Issued on Aug. 18, 2009, file through Mar. 1, 2012, 240 pages.

U.S. Appl. No. 10/512,687, filed Aug. 24, 2005, filed through Mar. 1, 2012, 525 pages.

U.S. Appl. No. 11/536,215, filed Sep. 28, 2006, U.S. Patent No. 7,516,287 Issued on Apr. 7, 2009, file through Mar. 1, 2012, 167 pages.

U.S. Appl. No. 11/536,233, filed Sep. 28, 2006, U.S. Patent No. 7,627,612 Issued on Dec. 1, 2009, file through Mar. 1, 2012, 256 page.

U.S. Appl. No. 11/536,160, filed Sep. 28, 2006, U.S. Patent No. 7,627,687 Issued on Dec. 1, 2009, file through Mar. 1, 2012, 230 pages.

U.S. Appl. No. 11/964,168, filed Dec. 26, 2007, U.S. Patent No. 7,797,357 Issued Sep. 14, 2010, file through Mar. 1, 2012, 222 pages.

* cited by examiner

JOURNAL VOLUME SEGMENTS AT STAGE 1

| BLOCK NO. | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| SEGMENT #1 | ID=1: 1 BLOCK OF DO METADATA | ID=2: 1 BLOCK OF DO METADATA | ID=3: 1 BLOCK OF DO METADATA | ID=1: 15 BLOCKS OF DO DATA | | | | | | | | | | | | ID=2: 5 BLOCKS OF DO DATA | | | | |
| SEGMENT #2 | | | | | | | | | | | | | | | | | | | | |
| SEGMENT #3 | ID=2: 15 BLOCKS OF DO DATA | | | | | | | | | | | | | | | ID=3: 5 BLOCKS OF DO DATA | | | | |
| SEGMENT #4 | ID=3: 15 BLOCKS OF DO DATA | | | | | | | | | | | | | | | | | | | |

*FIG. 3A*

JOURNAL VOLUME SEGMENTS AT STAGE 2

| BLOCK NO. | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| SEGMENT #1 | | | | | | | | | | | | | | | | ID=2: 5 BLOCKS OF DO DATA | | | | |
| SEGMENT #2 | | ID=2: 1 BLOCK OF DO METADATA | ID=3: 1 BLOCK OF DO METADATA | | | | | | | | | | | | | | | | | |
| SEGMENT #3 | | | | ID=2: 15 BLOCKS OF DO DATA | | | | | | | | | | | | ID=3: 5 BLOCKS OF DO DATA | | | | |
| SEGMENT #4 | | | | ID=3: 15 BLOCKS OF DO DATA | | | | | | | | | | | | | | | | |
| SEGMENT #5 | | | | ID=1: 15 BLOCKS OF UNDO DATA | | | | | | | | | | | | | | | | |
| SEGMENT #6 | ID=1: 1 BLOCK OF UNDO METADATA | | | | | | | | | | | | | | | | | | | |

*FIG. 3B*

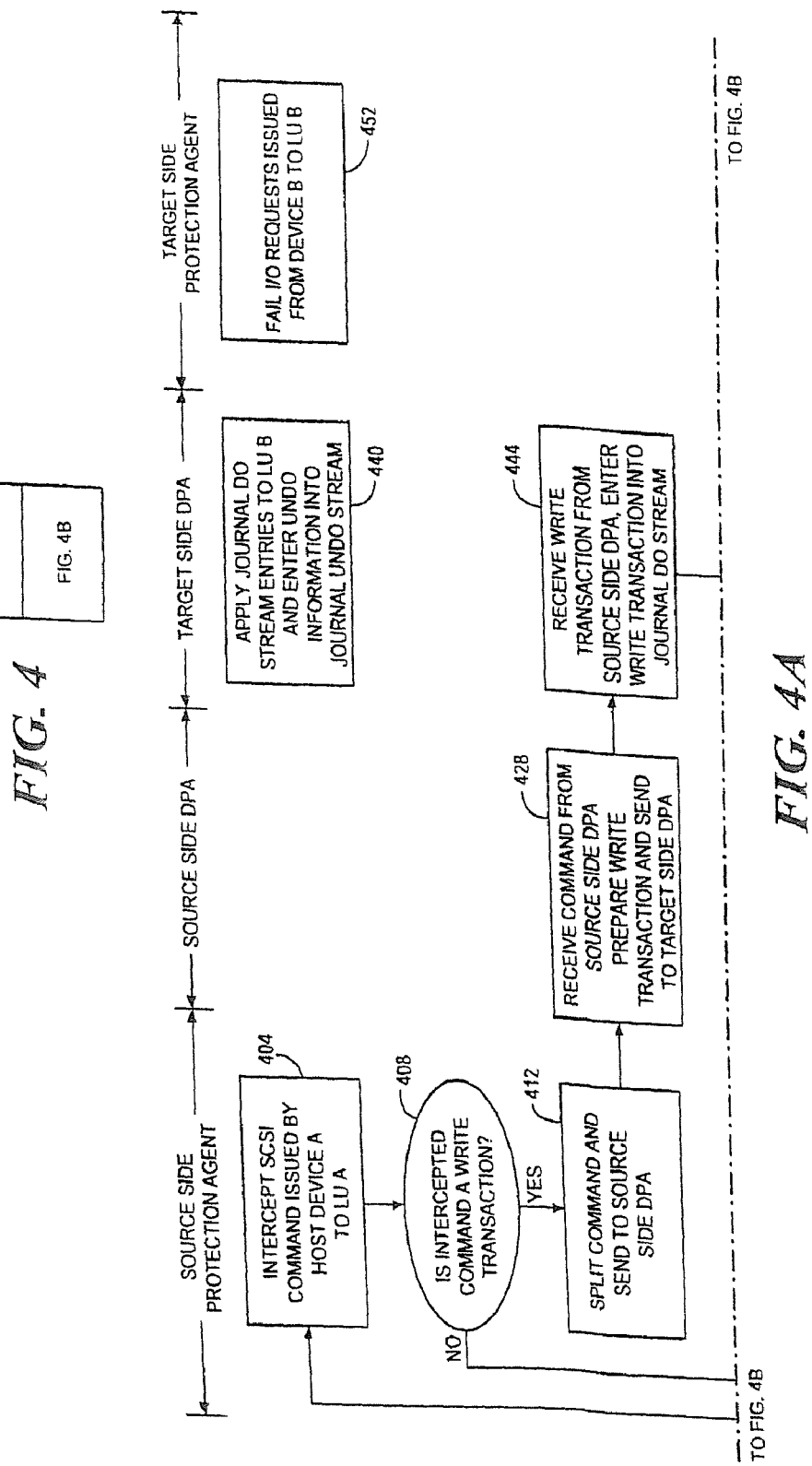

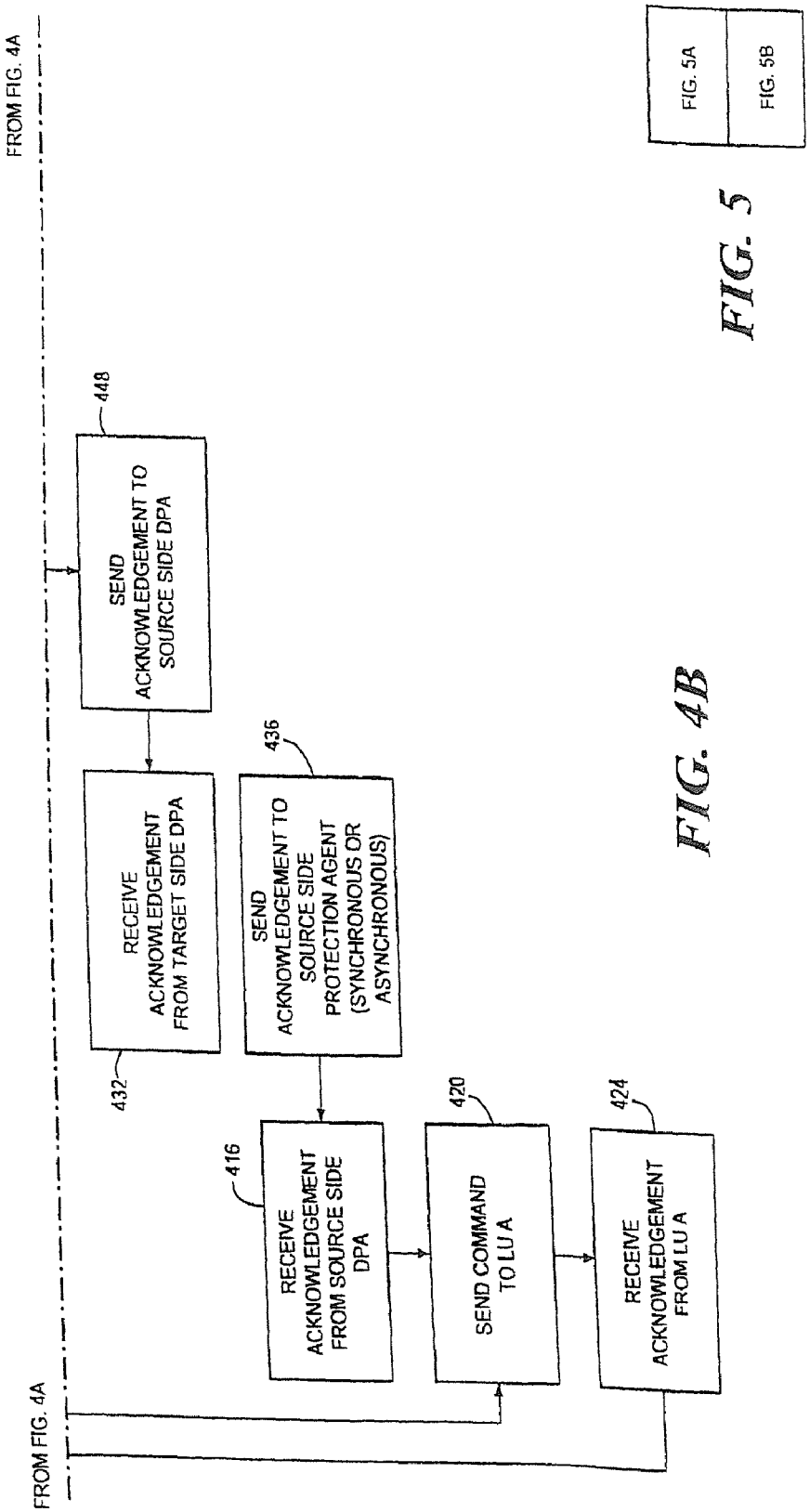

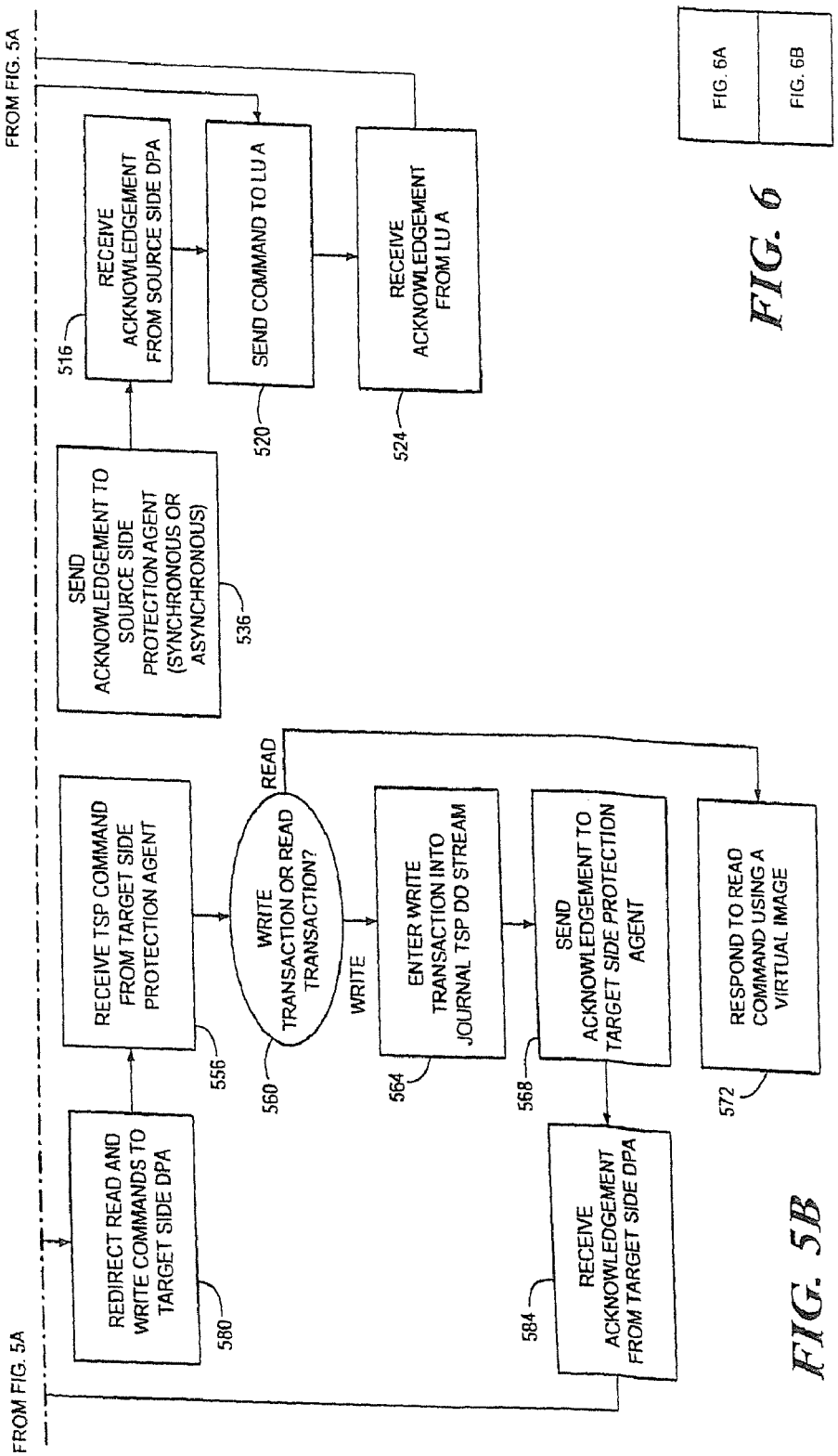

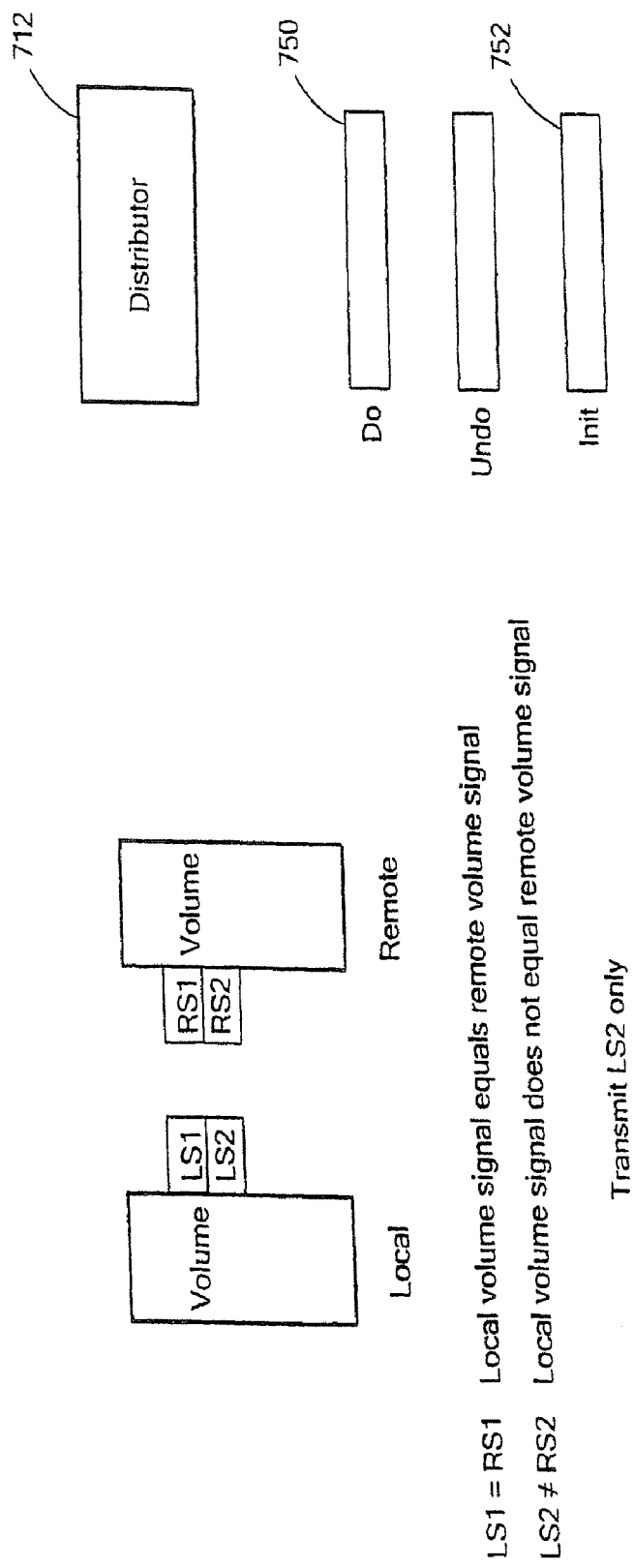

SPLITTER USED IN A CONTINUOUS DATA PROTECTION ENVIRONMENT

BACKGROUND

Computer data is vital to today's organizations, and a significant part of protection against disasters is focused on data protection. As solid-state memory has advanced to the point where cost of memory has become a relatively insignificant factor, organizations may afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site may recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point-in-time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point-in-time within a recent history.

Continuous data protection typically uses a technology referred to as "journaling," whereby a log is kept of changes made to the backup storage. During a recovery, the journal entries serve as successive "undo" information, enabling roll back of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

In one aspect, a method includes providing a splitter at a first storage array, receiving data from a host, storing the data on the first storage array, using a data protection appliance (DPA) to expose a device, continuously copying data stored on the first storage array to the device using the splitter and replicating the data to a second storage array using the DPA.

In another aspect, an article includes a non-transitory machine-readable medium that stores executable instructions. The instructions cause a machine to provide a splitter at a first storage array, receive data from a host, storing the data on the first storage array, use a data protection appliance (DPA) to expose a device, continuously copy data stored on the first storage array to the device using the splitter and replicate the data to a second storage array using the DPA.

In a further aspect, an apparatus, includes circuitry to provide a splitter at a first storage array, receive data from a host, storing the data on the first storage array, use a data protection appliance (DPA) to expose a device, continuously copy data stored on the first storage array to the device using the splitter and replicate the data to a second storage array using the DPA. In one example, the circuitry includes at least one of a processor, a memory, programmable logic and logic gates.

DESCRIPTION OF THE DRAWINGS

FIG. 3A is a simplified illustration of a first stage of a journal and four data streams stored therein, after recording three write transactions.

FIG. 3B is a simplified illustration of a second stage of a journal and four data streams stored therein, after applying a first write transactions to a storage system.

FIGS. 4A and 4B are a simplified flowchart of a data protection method during a normal production mode.

FIGS. 5A and 5B are a simplified flowchart of a data protection method during a data recovery mode, prior to completion of rollback.

FIG. 13A is a block diagram showing data signature comparison during volume synchronization.

FIG. 14 is a schematic depiction of a distributor for data streams using during volume synchronization.

DETAILED DESCRIPTION

Figure 1:
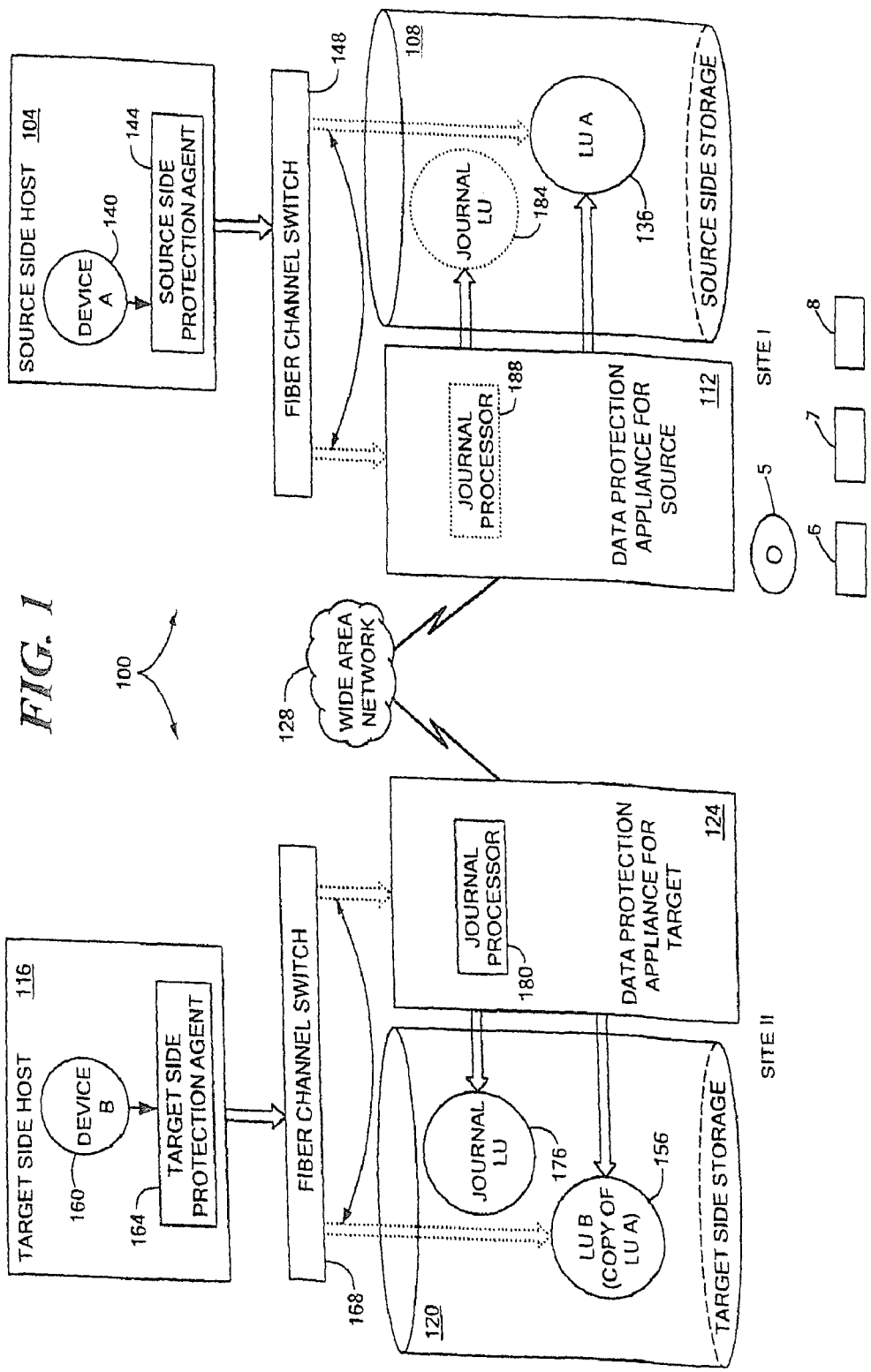
FIG. 1 is a simplified block diagram of a data protection system.

The following definitions are employed throughout the specification and claims.

BACKUP SITE—a facility where replicated production site data is stored; the backup site may be located in a remote site or at the same location as the production site;

DPA—a computer or a cluster of computers that serve as a data protection appliance, responsible for data protection services including inter alia data replication of a storage system, and journaling of I/O requests issued by a host computer to the storage system;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point-in-time;

INITIATOR—a node in a SAN that issues I/O requests;

JOURNAL—a record of write transactions issued to a storage system; used to maintain a duplicate storage system, and to rollback the duplicate storage system to a previous point-in-time;

LOGICAL UNIT—a logical entity provided by a storage system for accessing data from the storage system;

LUN—a logical unit number for identifying a logical unit;

PHYSICAL STORAGE UNIT—a physical entity, such as a disk or an array of disks, for storing data in storage locations that can be accessed by address;

PRODUCTION SITE—a facility where one or more host computers run data processing applications that write data to a storage system and read data from the storage system;

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

STORAGE SYSTEM—a SAN entity that provides multiple logical units for access by multiple SAN initiators TARGET—a node in a SAN that replies to I/O requests;

TARGET SIDE—a receiver of data within a data replication workflow; during normal operation a back site is the target side, and during data recovery a production site is the target side;

WAN—a wide area network that connects local networks and enables them to communicate with one another, such as the Internet.

The methods and apparatus of exemplary embodiments may take the form, at least partially, of program code (i.e., instructions) embodied in tangible media, such as disks (element 5 in FIG. 1), CD-ROMs 6, hard drives 7, random access or read only-memory 8, or any other machine-readable storage medium, including transmission medium. When the program code is loaded into and executed by a machine, such as a computer, the machine becomes an apparatus for practicing the embodiments described herein. The media can include portions in different system components, such as memory in a host, an application instance, and or, a management station. The methods and apparatus may be embodied in the form of program code that may be implemented such that when the program code is received and loaded into and executed by a machine, such as a computer, the machine becomes an apparatus for practicing the embodiments described herein. When implemented on processor, the program code combines with the processor to provide a unique apparatus that operates analogously to specific logic circuits. The program code (software-based logic) for carrying out the method is embodied as part of the system described below.

Reference is now made to FIG. 1, which is a simplified illustration of a data protection system 100. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier point-in-time, which may be used in the event of data corruption of a disaster, or alternatively in order to view or to access data from an earlier point-in-time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use.

Each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as small computer system interface (SCSI) commands, sent by an initiator node. A SAN may also include network switches, such as fiber channel switches. The communication links between each host computer and its corresponding storage system may be any appropriate medium suitable for data transfer, such as fiber communication channel links.

The host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes (e.g., makes available) one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In one example, storage system 108 exposes a logical unit 136, designated as LU A, and storage system 120 exposes a logical unit 156, designated as LU B.

In one example, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in some examples, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally, a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In one example, host device 104 identifies LU A and generates a corresponding host device 140, designated as Device A, through which it can access LU A. Similarly, host computer 116 identifies LU B and generates a corresponding device 160, designated as Device B.

In one example, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail herein below, when acting as a target side DPA, a DPA may also enable rollback of data to an earlier point-in-time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In one example, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In on example, host computer 104 and host computer 116 include protection agents 144 and 164, respectively. Protection agents 144 and 164 intercept SCSI commands issued by their respective host computers, via host devices to logical units that are accessible to the host computers. In other examples, a data protection agent may act on an intercepted SCSI commands issued to a logical unit, in one of the following ways:

Send the SCSI commands to its intended logical unit.
Redirect the SCSI command to another logical unit.
Split the SCSI command by sending it first to the respective DPA. After the DPA returns an acknowledgement, send the SCSI command to its intended logical unit.
Fail a SCSI command by returning an error return code.
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In one example, protection agents communicate with their respective DPAs by sending SCSI commands over fiber channel.

In one example, protection agents 144 and 164 are drivers located in their respective host computers 104 and 116. Alternatively, a protection agent may also be located in a fiber channel switch, inside the storage system or in any other device situated in a data path between a host computer and a storage system.

What follows is a detailed description of system behavior under normal production mode, and under recovery mode.

In one example, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in one example, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In one example, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
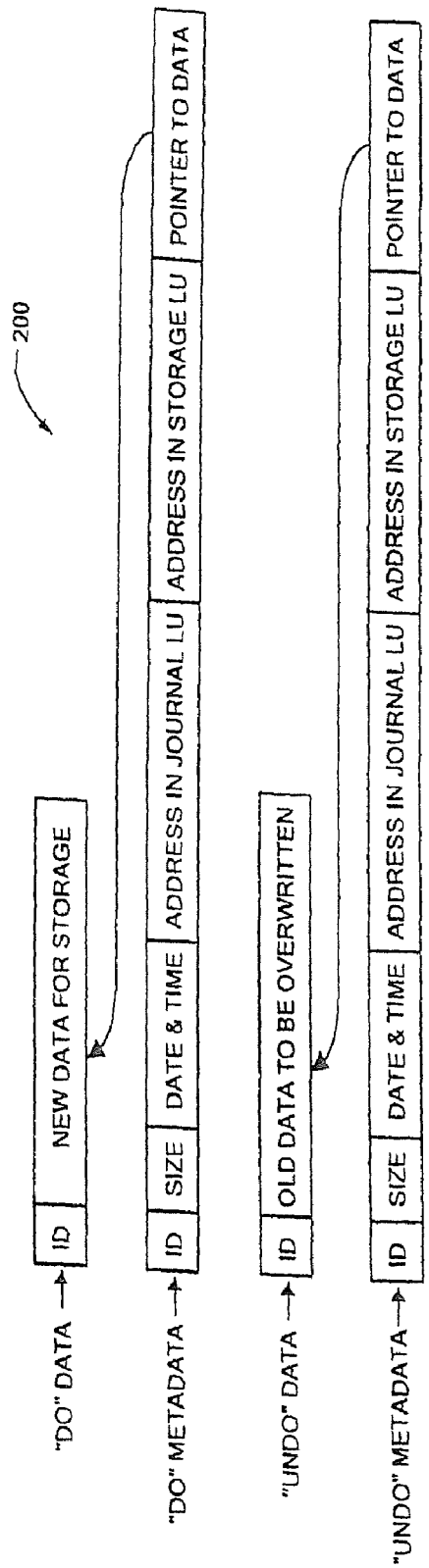
FIG. 2 is a simplified illustration of a journal history of write transactions for a storage system.

Reference is now made to FIG. 2, which is a simplified illustration of a write transaction 200 for a journal. The journal may be used to provide an adaptor for access to storage 120 at the state it was in at any specified point-in-time. Since the journal contains the "undo" information necessary to rollback storage system 120, data that was stored in specific memory locations at the specified point-in-time may be obtained by undoing write transactions that occurred subsequent to such point-in-time.

Write transaction 200 generally includes the following fields:

one or more identifiers;
a time stamp, which is the date & time at which the transaction was received by source side DPA 112;
a write size, which is the size of the data block;
a location in journal LU 176 where the data is entered;
a location in LU B where the data is to be written; and
the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a predefined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

When a write transaction is received, journaling is thus advanced as indicated in TABLE I below.

TABLE I

Entering a write transaction in the journal

| | |
|---|---|
| Step 1 | The new data is written at the end of the DO stream, assuming a forward write direction, and corresponding metadata is written at the end of the DO METADATA stream. |
| Step 2 | Data is read from the beginning of the DO stream, and corresponding metadata is read from the beginning of the DO METADATA stream. |
| Step 3 | Old data to be overwritten is read from LU B. The location and size of such old data is determined from the DO METADATA stream. |
| Step 4 | The old data is written at the end of the UNDO stream, and corresponding metadata is written at the end of the UNDO METADATA stream. |
| Step 5 | The new data read at Step 2 is written into LU B, and the beginning and end pointers of the DO and DO METADATA streams are moved appropriately. |

Conversely, during a rollback to undo a write transaction, the above operations are reversed, as indicated in TABLE II below.

TABLE II

Undoing a write transaction in the journal

| | |
|---|---|
| Step 1 | Read the data and metadata from the end of the UNDO and UNDO METADATA streams. |
| Step 2 | Read from LU B the data that is to be overwritten. The location and size of such data is determined from the UNDO METADATA stream. |
| Step 3 | Write the data from Step 2 at the beginning of the DO stream, and update the DO METADATA stream accordingly. |
| Step 4 | Write the data from Step 1 to LU B, and update the beginning and end pointers of the UNDO and UNDO metadata streams appropriately. |

The following example, in conjunction with FIGS. 3A-3D, describes specific details of the journaling process. A journal volume includes a plurality of segments from a segment pool, each segment including 20 data blocks.

Three write transactions are received, as indicated in TABLE III.

TABLE III

Example Write Transactions

| Write ID | Time | LU B location | Length | Journal LU location |
|---|---|---|---|---|
| 1 | Dec. 03, 2005 10:00:00.00 | LU B offset 57 blocks | 15 blocks | Segment 1, offset 0 |
| 2 | Dec. 03, 2005 10:00:00.05 | LU B offset 87 blocks | 20 blocks | Segment 1, offset 15 |
| 3 | Dec. 03, 2005 10:00:00.18 | LU B offset 12 blocks | 20 blocks | Segment 3, Offset 15 |

The following discussion describes four stages of journaling and data storage; namely, Stage #1: Enter the three write transactions as journal entries in the journal LU.

Stage #2: Apply the first write transaction to LU B.

Stage #3: Apply the second write transaction to LU B.

Stage #4: Rollback the second write transaction, to recover data from an earlier point-in-time.

The write transaction with ID=1 is written to the first 15 blocks of Segment #1. The metadata corresponding to this transaction is written to the first block of Segment #2. The second write transaction with ID=2 is written to the last 5 blocks of Segment #1 and the first 15 blocks of Segment #3. The metadata corresponding to this transaction is written to the second block of Segment #2. The third write transaction with ID=3 is written to the last 5 blocks of Segment #3 and the first 15 blocks of Segment #4. The metadata corresponding to this transaction is written to the third block of Segment #2.

Thus at stage #1, the DO stream in memory includes a list of segments 1, 3, 4; and a beginning pointer to offset=0 in Segment #1 and an end pointer to offset=10 in Segment #4. The DO METADATA stream in memory includes a list of one segment, namely Segment #2; and a beginning pointer to offset=0 in Segment #2 and an end pointer to offset=3 in Segment #2. The UNDO stream and the UNDO METADATA stream are empty. The journal and the four streams at the end of stage #1 are illustrated in FIG. 3A.

At stage #2 the write transaction with ID=1 is applied to LU B. New data to be written is read from the journal LU at the offset and length indicated in the DO METADATA; namely, 15 blocks of data located in blocks 0-14 of journal volume Segment #1. Correspondingly, old data is read from LU B at the offset and length indicated in the UNDO METADATA; namely, 15 blocks of data located in blocks 57-71 of LU B. The old data is then written into the UNDO stream in the journal LU, and the associated metadata is written into the UNDO METADATA stream in the journal LU. Specifically, for this example, the UNDO data is written into the first 15 blocks of Segment #5, and the UNDO METADATA is written into the first block of Segment #6. The beginning pointer of the UNDO data stream is set to offset=0 in Segment #5, and the end pointer is set to offset=15 in Segment #5. Similarly, the beginning pointer of the UNDO METADATA stream is set to offset=0 on Segment #6, and the end pointer is set to offset=1 in Segment #6.

At this point, the new data that was read from blocks 0-14 of journal LU Segment #1 is written to blocks 57-71 of LU B. The beginning pointer for the DO stream is moved forward to block 15 of journal LU Segment #1, and the beginning pointer for the DO METADATA stream is moved forward to block 1 of journal LU Segment #2. The journal and the four streams at the end of stage #2 are illustrated in FIG. 3B.

At stage #3 the write transaction with ID=2 is applied to the storage system. As above, 20 blocks of new data are read from blocks 15-19 of journal LU Segment #1 and from blocks 0-14 of journal LU Segment #3. Similarly, 20 blocks of old data are read from blocks 87-106 of LU B. The old data is written to the UNDO stream in the last 5 blocks of journal LU Segment #5 and the first 15 blocks of journal LU Segment #7. The associated metadata is written to the UNDO METADATA stream in the second block of Segment #6. The list of segments in the UNDO stream includes Segment #5 and Segment #7. The end pointer of the UNDO stream is moved to block 15 of Segment #7, and the end pointed of the UNDO METADATA stream is moved to block 2 of Segment #6.

Figure 3C:
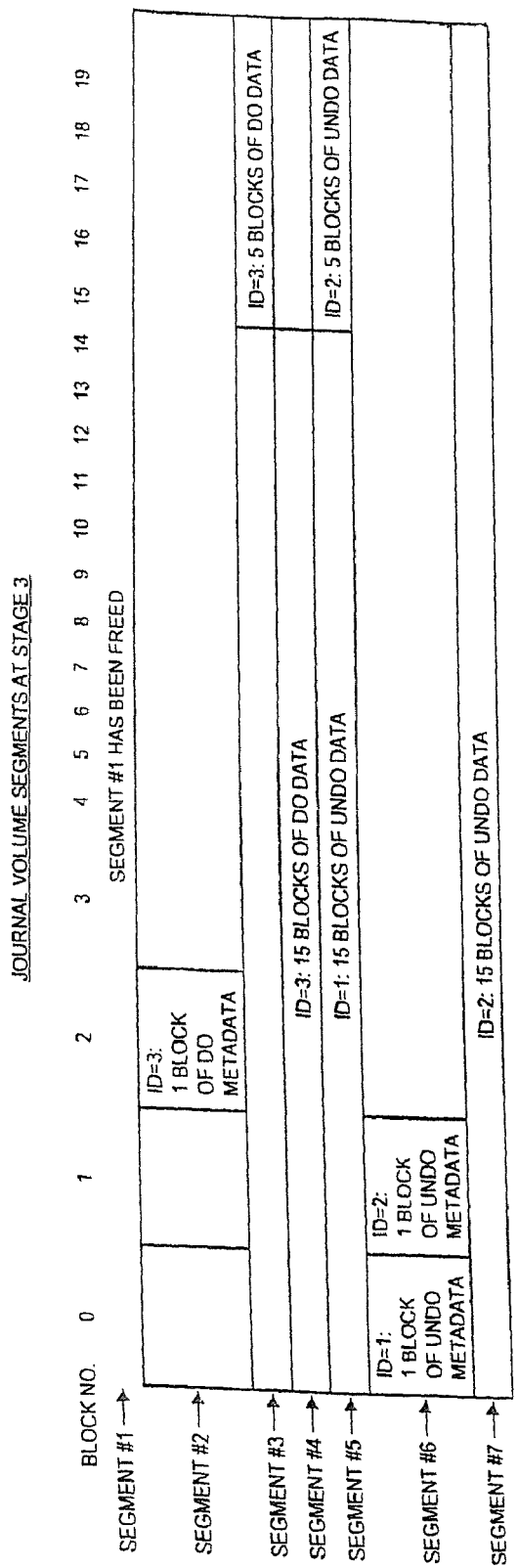
FIG. 3C is a simplified illustration of a third stage of a journal history and four data streams stored therein, after applying a second write transactions to a storage system.

Finally, the new data from blocks 15-19 of journal LU Segment #1 and blocks 0-14 of journal LU Segment #3 is written into blocks 87-106 of LU B. The beginning pointer for the DO stream is moved forward to block 15 of journal volume Segment #3, and the beginning pointer for the DO METADATA stream is moved forward to block 2 of journal LU Segment #2. Segment #1 is freed from the DO stream, for recycling within the segment pool, and the list of segments for the DO stream is changed to Segment #3 and Segment #4. The journal and the four streams at the end of stage #3 are illustrated in FIG. 3C.

At stage #4 a rollback to time 10:00:00.00 is performed. Since the write transaction with ID=3 was not applied yet, the only write transaction to be undone is the write transaction with ID=2. The last entry is read from the UNDO METADATA stream, the location of the end of the UNDO METADATA stream being determined by its end pointer, i.e., the metadata before block 2 of journal LU Segment #6 is read, indicating two areas each of 20 blocks; namely, (a) the last 5 blocks of journal LU Segment #5 and the first 15 blocks of journal LU Segment #7, and (b) blocks 87-106 of LU B. Area (a) is part of the UNDO stream.

The 20 blocks of data from area (b) are read from LU B and written to the beginning of the DO stream. As the beginning pointer of the DO stream is set to offset=15 of journal LU Segment #3, 5 blocks are written at the end of Segment #3, and the remaining 15 blocks are written to Segment #8. The end pointer for the DO stream is set to block 15 of Segment #8. The list of segments for the DO stream is changed to Segment #3, Segment #4 and Segment #8. The metadata associated with the 20 blocks from area (b) is written to block 3 of Segment #2, and the end pointer of the DO METADATA stream is advanced to block 4 of Segment #2.

Figure 3D:
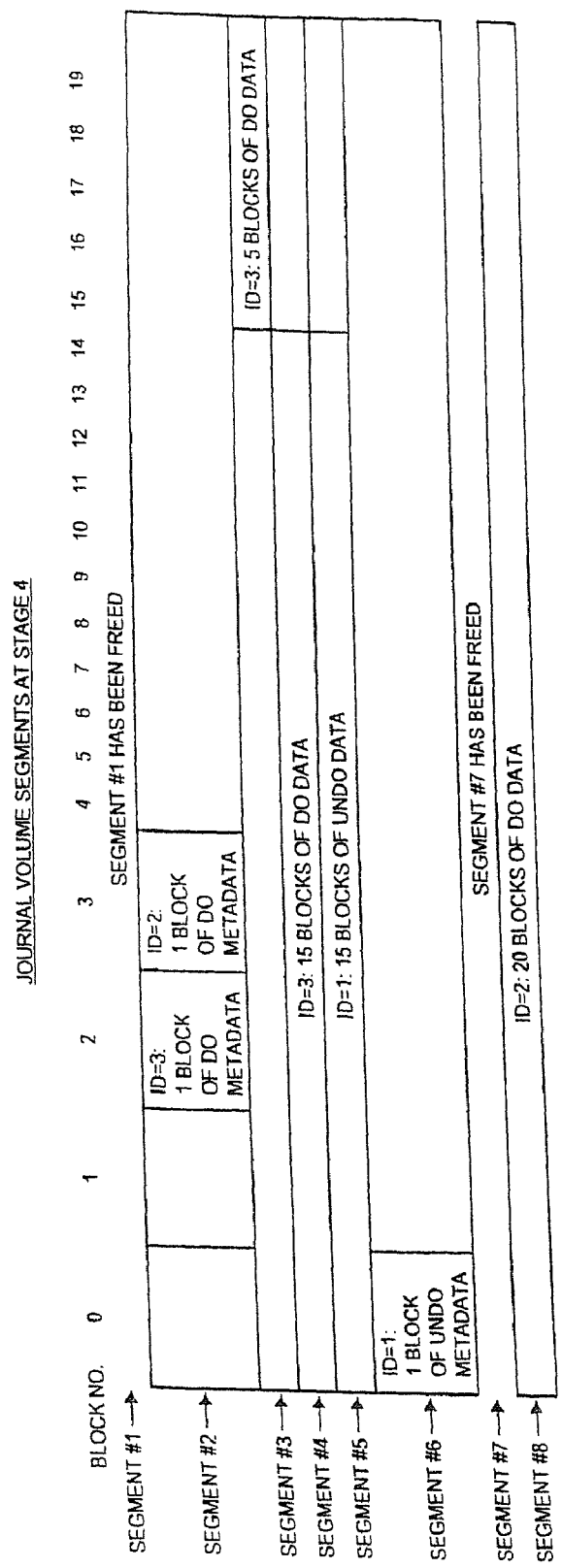
FIG. 3D is a simplified illustration of a fourth stage of a journal history and four data streams stored therein, after rolling back a write transaction.

The 20 blocks of data in area (a) of the journal LU are then written to area (b) of the LU B. Finally, Segment #7 is freed for recycling in the segment pool, the UNDO stream ending pointer is moved back to Segment #5 of the journal LU, block 15, and the UNDO METADATA stream ending pointed is moved back to Segment #6 of the journal LU, block 1. The journal and the four streams at the end of stage #4 are illustrated in FIG. 3D.

Thus it may be appreciated that the journal is thus used to rollback LU B to the state that it was in at a previous point-in-time. The journal is also used to selectively access data from LU B at such previous point-in-time, without necessarily performing a rollback. Selective access is useful for correcting one or more files that are currently corrupt, or for simply accessing old data.

TABLE IV below summarizes the behavior of the special protection components of system 100 during production mode. Reference is also made to FIG. 4, which is a simplified flowchart of a data protection method corresponding to TABLE IV. FIG. 4 is divided into four columns. The leftmost column indicates steps performed by source side protection agent 112, the middle left column indicates steps performed by source side DPA 144, the middle right column indicates steps performed by target side DPA 124, and the rightmost column indicates steps performed by target side protection agent 164.

TABLE IV

Normal Production Mode Functionality

| System Component | Behavior |
| --- | --- |
| Source Side Agent 144 | Intercept SCSI commands issued to LU A by source side host via Device A (step 404). Replicate write commands, and route write commands to DPA (steps 408 and 412). Wait for first acknowledgement, from DPA (step 416), and then route replicate I/O command to LU A (step 420). Wait for second acknowledgement, from storage system (step 424), and then process next intercepted SCSI command (step 404). |
| Source Side DPA 112 | Receive write command from agent (step 428). Format write command as write transaction, and send to target DPA (step 428). In synchronous mode, wait for acknowledgement from target DPA (step 432), and then send acknowledgement to agent (step 436). In asynchronous mode and in snapshot mode, send acknowledgement to agent without waiting for acknowledgement from target DPA (step 436). |
| Target Side DPA 124 | Receive write transaction from source DPA (step 444). Enter write transaction in journal DO and DO METADATA streams (step 444), and send back acknowledgement to source DPA (step 448). Process journal entries by applying them to LU B, and enter undo information in UNDO and UNDO METADATA streams (step 440). |
| Target Side Agent 164 | Fail SCSI commands issued to LU B (step 452). |

Only steps with arrows connecting them in FIGS. 4A and 4B are necessarily sequential. Thus steps 432 and 436, which do not have arrows connecting them, are not necessarily sequential. In a synchronous mode these steps are sequential, but in asynchronous mode and in snapshot mode they are not sequential. In particular, DPA 112 may send an acknowledgement to protection agent 144 before receiving an acknowledgement back from DPA 124.

It is also noted in FIGS. 4A and 4B that the steps performed by target side DPA 124 include two non-sequential groups; namely, (i) step 440, and (ii) steps 444 and 448.

Recovery mode is generally triggered as a result of a disaster at the source side. The source side data may become corrupt, or may not exist at all. In such case, after recovery is completed at the backup site, a user may perform a failover operation by switching the roles of the production site and backup site. The original backup site becomes a current production site, and the original production site becomes a current backup site. Alternatively, recovery mode can be triggered without a failover, in order to access data from a previous point-in-time.

While in recovery mode, target site DPA 124 continues to receive new write transactions from DPA 112 and enter them at the ends of the DO and DO METADATA streams. However, unlike production mode behavior, DPA 124 stops applying journal entries received from DPA 112 to LU B. Instead, DPA 124 uses the UNDO stream of the journal to rollback LU B, as described hereinabove.

During recovery, after or possibly before rollback of LU B is complete, a user may wish to access data from the target site. To this end, protection agent 164 stops failing I/O requests issued by host computer 160 and begins redirecting them to DPA 124. The processing of data by host computer 160 during recovery mode is referred to as "target side processing (TSP)".

To manage TSP write commands that are received by target side DPA 124, journal processor 180 uses two additional data streams, referred to as TSP DO and TSP METADATA streams. When a TSP write command is received by DPA 124, it is entered at the end of the TSP DO stream and the end of the TSP DO METADATA stream. Since TSP writes relate to the state of LU B after the rollback is complete, the TSP DO stream writes are only applied to LU B after rollback is complete. Journal processor 180 applies TSP writes to LU B in a way similar to the way it applies write transactions deceiver from DPA 112; namely, journal processor 180 maintains the undo information for each write applied to LU B, in TSP UNDO and TSP UNDO METADATA streams.

When TSP read commands are received by target site DPA 124, DPA 124 returns the data to be read by identifying locations of the read command, and finding the most recent TSP write command or commands that were applied at these locations. The data is searched for (i) first in the TSP DO stream, and (ii) then in the journal UNDO data that was not yet applied to LU B and (iii) finally, if the data was not found in (i) and (ii), then the data is taken from LU B itself. In order to perform such a search efficiently, DPA 124 generates and stores in its memory a virtual image of the UNDO METADATA storage locations by using an efficient data structure, such as a binary search tree.

After rollback is completed, the TSP writes that were performed during the rollback are applied to LU B, and DPA 124 begins applying TSP writes synchronously; i.e., TSP writes are applied to LU B when they are received by DPA 124, without keeping them in the TSP DO stream. As such, when a read command is received after rollback is complete, it is sent directly to LU B instead of being redirected through DPA 124.

TABLES V and VI below summarize the behavior of the special protection components of system 100 during recovery mode, before and after the rollback is complete. Reference is also made to FIGS. 5A, 5B, 6A and 6B which are simplified flowcharts of data protection methods corresponding to TABLES V and VI, respectively. FIGS. 5A, 5B, 6A and 6B are divided into four columns. The leftmost column indicates steps performed by target side protection agent 164, the middle left column indicates steps performed by target side DPA 124, the middle right column indicates steps performed by source side DPA 112, and the rightmost column indicates steps performed by source side protection agent 144.

TABLE V

Recovery Functionality prior to Completion of Rollback

| System Component | Behavior |
| --- | --- |
| Target Side Agent 164 | Intercept SCSI commands issued to LU B (step 576). Redirect commands to DPA (step 580). |
| Target Side DPA 124 | Use UNDO stream of journal to roll back target storage system (step 540). Continue receiving write transactions from DPA 112 and enter these transactions into DO and DO METADATA streams without applying them to LU B (step 548). Enter TSP write transactions to TSP DO and TSP DO METADATA streams (step 564). Create a virtual image, to reply to read commands issued during the recovery process (step 572). |
| Source Side DPA 112 | As in production mode. |
| Source Side Agent 144 | As in production mode. |

TABLE VI

Recovery Functionality after Completion of Rollback

| System Component | Behavior |
| --- | --- |
| Target Side Agent 164 | Intercept SCSI commands issued to LU B (step 664). Redirect write transactions to DPA (step 672), and route read commands directly to LU B (step 680). |
| Target Side DPA 124 | Apply TSP write transactions to LU B, in the same manner that write transactions received from DPA 112 are applied in production mode; i.e., by entering data into TSP UNDO and TSP UNDO METADATA streams (step 640). Enter DO information and write transactions received from DPA 112 into DO and DO METADATA streams, without applying them to LU B (step 644). Apply TSP write transactions to LU B as they are received (step 656). |
| Source Side DPA 112 | As in production mode. |
| Source Side Agent 144 | As in production mode. |

Figure 5A:
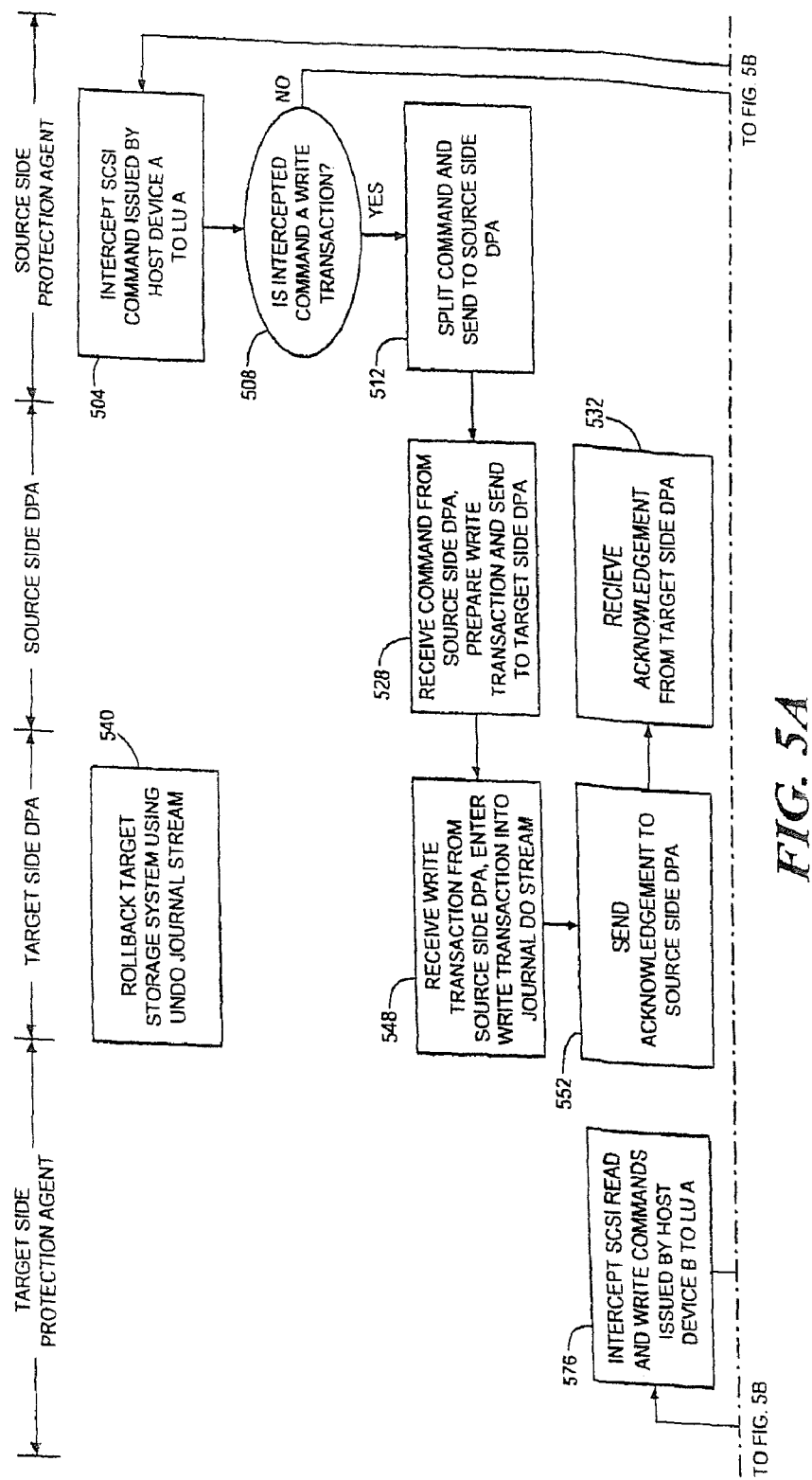
Figure 6A:
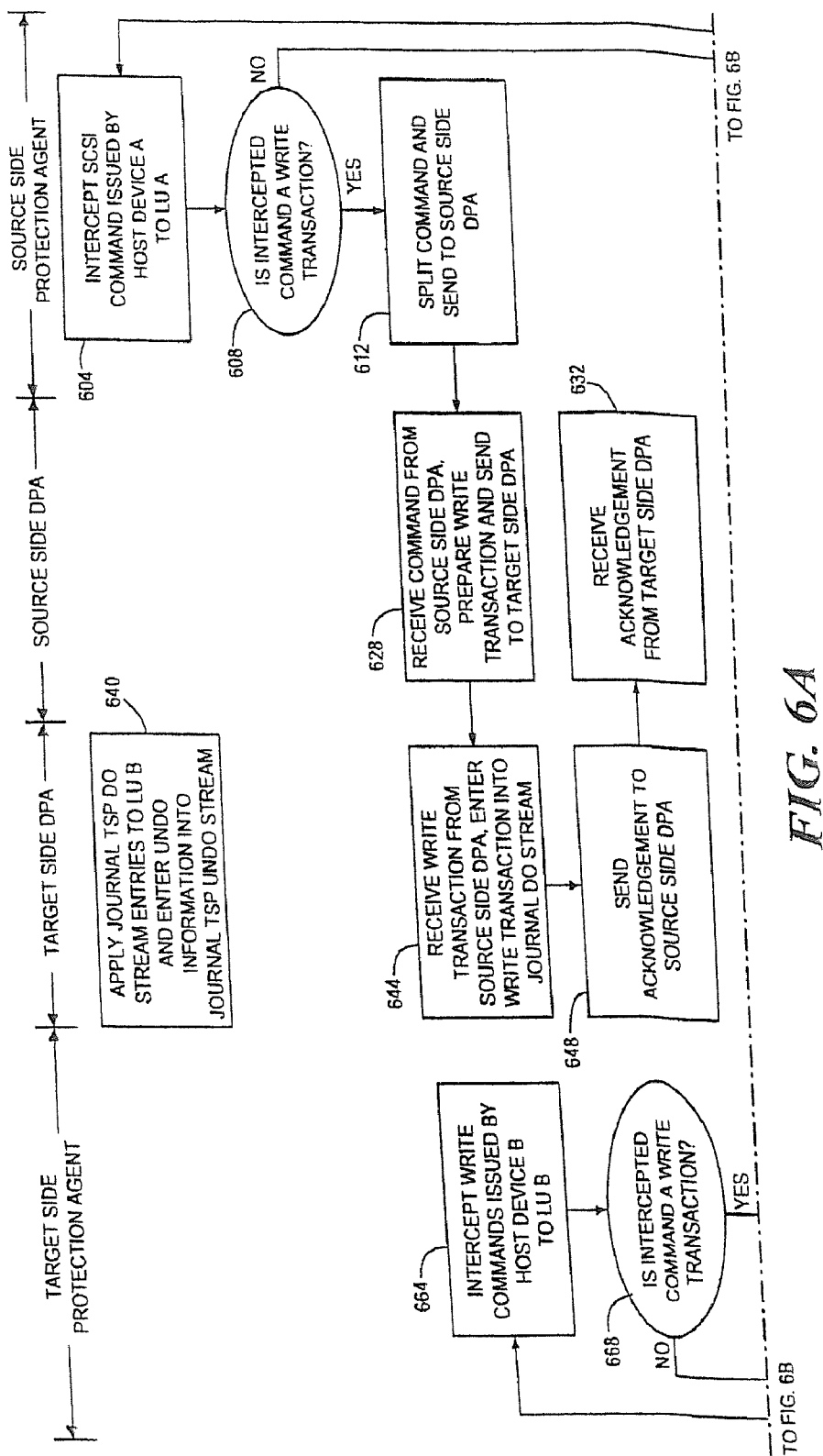
FIGS. 6A and 6B are a simplified flowchart of a data protection method during a data recovery mode, after completion of rollback.
Figure 6B:
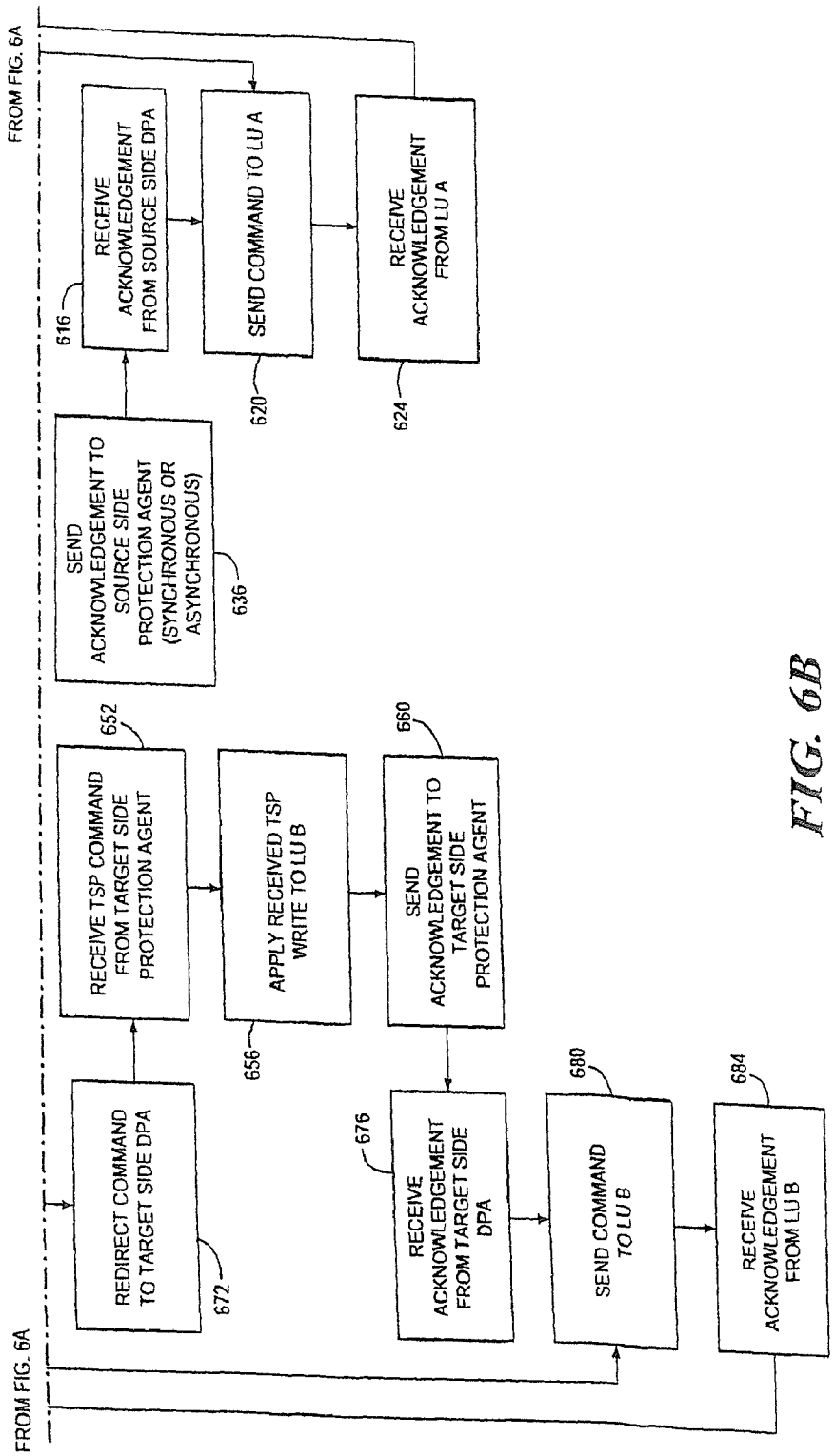

It is also noted in FIGS. 5A and 5B that the steps performed by target side DPA 124 include three non-sequential groups; namely, (i) step 540, (i) steps 548 and 552, and (iii) steps 556, 560, 564, 568 and 572. Similarly in FIGS. 6A and 6B target side DPA performs three non-sequential groups of steps; namely, (i) step 640, (ii) steps 644 and 648, and (iii) steps 652, 656 and 660.

Figure 7:
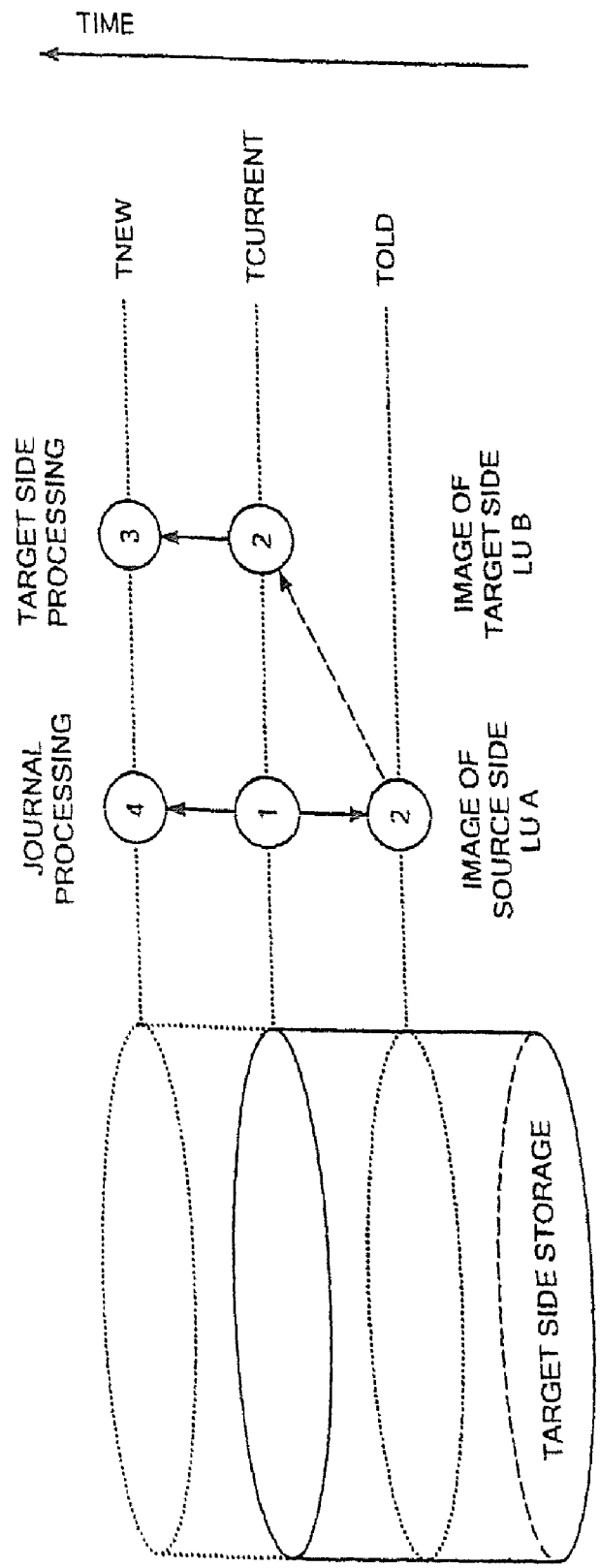
FIG. 7 is a simplified illustration of a time-line for tracking new processing of old data.

Reference is now made to FIG. 7, which is a simplified illustration of a time-line for tracking new processing of old data. FIG. 7 illustrates journal processor 180 bringing the timeline back to a previous time, TOLD, and journal processor 180 applying TSP writes to bring the timeline forward from time TCURRENT to time TNEW. As shown in FIG. 7, current data at time (1) is rolled back to old data at time (2). After rolling back the data to time (2), the rolled back data becomes the image upon which target side processing advances to new data at time (3); i.e., the target side processing is applied to data (2) and not to data (1).

The data at time (1) is a common image for LU A and LU B at the same point-in-time, TCURRENT. Similarly, the data at time (2) is a common image for LU A and LU B at time TOLD. Rolled back data at time (2) may be processed by TSP writes, while at the same time current data at time (1) is being processed by source side writes. As such, the data evolves along the path from time (2) to time (3) as it is processed by the target side, and along the path from time (2) to time (4) as it is processed by the source side. The data images at the source and target sides at time TNEW are thus different.

When the recovery process is completed, the user may (i) return to a normal production mode, or (ii) perform a failover by switching the replication direction. In case (i), LU B is rolled back to its state at time (2), and the write transactions along the path from (2) to (4) are applied to LU B, so as to bring LU B to the same image as LU A. Conversely, in case (ii), LU B is maintained at its state at time (3), and its data is copied from the target side to the source side so as to bring LU A to the same image as LU B.

It may be appreciated that after rolling back the UNDO data stream to LU B, the state of the target side storage is substantially identical to the state that LU A was in at an earlier point-in-time. However, after applying TSP writes, the state of LU B is then in a new state that is different from the earlier state of LU A. As such, in order to return to a normal production mode, and ensure that LU B is a copy of LU A, DPA 124 undoes the TSP writes that were written to LU B using the TSP undo stream, and then returns to its normal production mode and begins applying the data that was written into the DO stream. The DO stream includes all write transactions that were undone while LU B was rolled back. Additionally, the DO stream includes new journal entries that were received from DPA 112 while DPA was in recovery mode. Similarly, protection agent 164 returns to its production mode by beginning to fail I/O requests issued by host 116.

Alternatively, the user wants to perform a failover; i.e., to make LU B in its current state a production LU and to ensure that LU A is a copy of LU B. In this case the write transactions in the DO stream that correspond to a point-in-time subsequent to the recovered point-in-time are ignored. Additionally, the TSP writes that were applied to LU B during the recovery process are applied to LU A. Thereafter, the replication direction changes. Specifically, DPA 124 and protection agent 164 begin behaving in accordance with source site behavior, and DPA 112 and protection agent 144 begin behaving in accordance with target site behavior.

It may be appreciated that in order to provide failover capability, in which the roles of the production site and the backup site are switched, it is desirable that the source side has the necessary system components to function as a target side, and vice versa. Thus, in one example, the source side includes its own journal LU 184 and journal processor 188, as indicated with dotted lines in FIG. 1.

Figure 8:
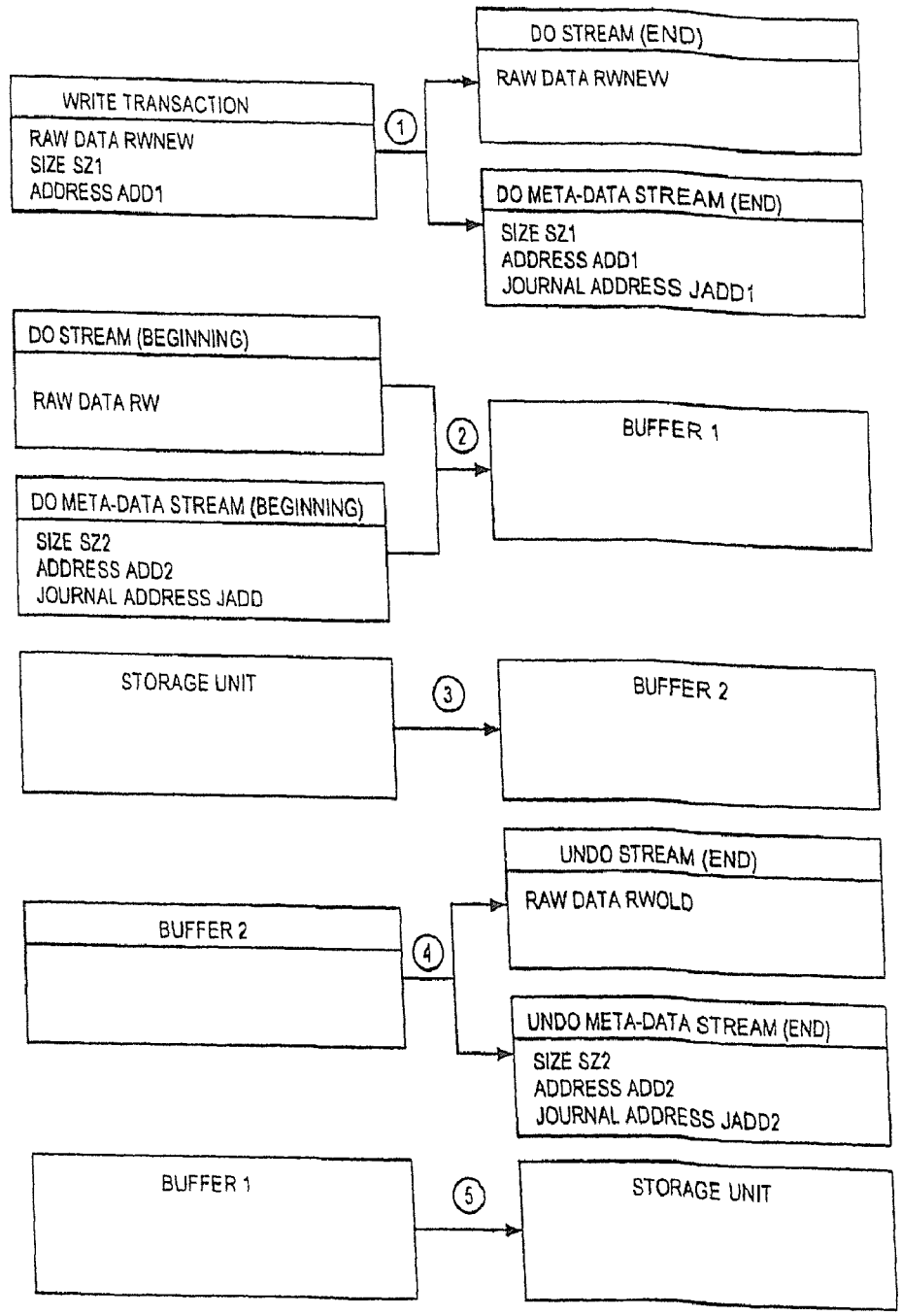
FIG. 8 is a simplified illustration of a five-stage journaling process for continuous data replication.

Referring back to TABLE I, it may be appreciated that during normal data replication, for each write transaction received from a production site, there are five I/O operations performed at a backup site. Reference is now made to FIG. 8, which is a simplified illustration of a 5-stage journaling process for continuous data replication. The five steps shown in FIG. 8 correspond respectively to the five steps listed in TABLE I. For the sake of clarity, FIG. 8 only shows three meta-data elements; namely, a size, a journal address and a storage address. It may be appreciated that the meta-data in the DO METADATA and UNDO METADATA streams includes an ID, a time, and other attributes.

In one example, the meta-data for each transaction is of a fixed size, typically 30 bytes. The raw data varies in size, typically averaging around 10 KB per transaction.

As write transactions performed at a production site vary in frequency, and as each write transaction at the production site normally requires five I/O transactions at the backup site, it may be appreciated that the size of the DO stream grows and shrinks accordingly. When the I/O rate is low, the beginning of the DO stream is close to the end of the DO stream. In such case, it is possible to keep all write transactions between the beginning and the end of the DO stream in memory, and there is no need to read the beginning of the DO stream for every new transaction received in the backup site. As such, step 2 may be skipped.

Figure 9:
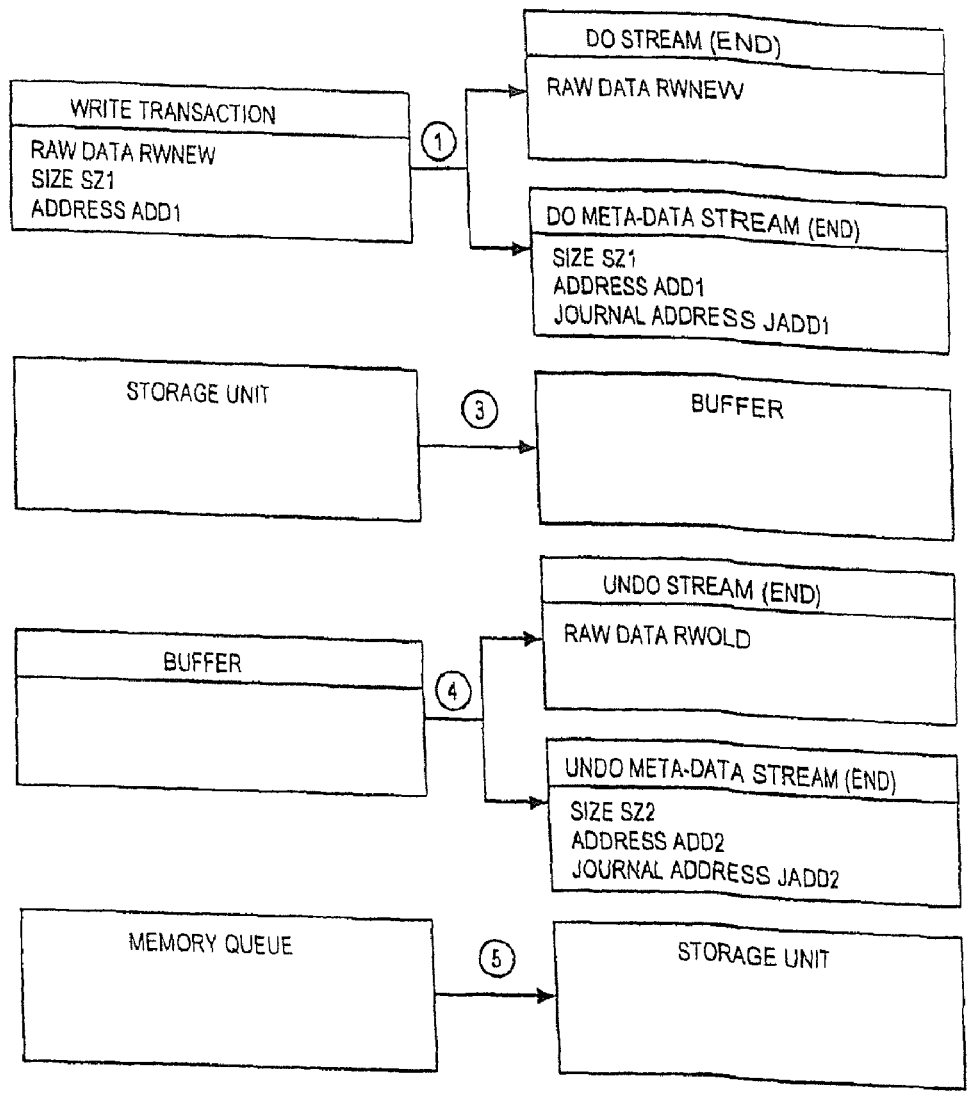
FIG. 9 is a simplified illustration of a four-stage journaling process for continuous data replication, for use when an I/O data rate is low.

Reference is now made to FIG. 9, which is a simplified illustration of a 4-stage journaling process for continuous data replication, for use when an I/O data rate is low. The first step in FIG. 9 copies the write transaction to the end of the DO stream and the end of the DO METADATA stream, as in the 5-stage journaling process. Unlike, the 5-stage journaling process, though, instead of reading write transaction data from the beginning of the DO and DO METADATA streams, the 4-stage journaling process takes advantage of the fact that the write transaction that was just received at the backup site is still resident in memory. For this write transaction, steps 3-5 are performed, as indicated in FIG. 9.

However, during the steps 3-5 distribution of the write transaction that was just received, it is possible that a new transaction arrives at the backup site. In order to keep pace with the arriving transaction, as each write transaction is entered into the ends of the DO and DO METADATA streams, the write transaction is written into the end of a queue in memory. In one example, the queue in memory is handled similar to the way the DO stream is handled; namely, each received write is appended to the end of the queue, and when a write transaction is distributed according to steps 3-5, a subsequent write transaction is taken from the beginning of the queue. Effectively, the queue corresponds to a cached DO stream.

The 4-stage journaling process is used until the queue in memory is full, at which point the normal 5-stage journal processing is resumed. Also in the event of a disaster, the normal 5-stage journal processing is resumed. In order to resume the 5-stage journal processing, it is important to identify the last write in the DO stream that was written. As such, even during the 4-stage journal processing, the pointers to the first and last write transactions in the DO stream are updated.

Conversely, when the I/O rate is high, in order to control the size of the DO stream and ensure that it does not overflow its disk allotment, the normal 5-stage mode may be switched to a faster 3-stage mode whenever the DO stream reaches a large percentage of its maximum capacity, typically 80%. The faster 3-stage mode is switched back to the normal 5-stage mode whenever the DO stream is reduced to a smaller percentage of its maximum capacity, typically 75%.

The 3-stage mode eliminates steps 3 and 4 from the normal mode; namely, the steps that record the UNDO information. As such, rollback of the backup storage unit to its state at the times of those transactions processed with the 3-stage mode is not possible.

Figure 10:
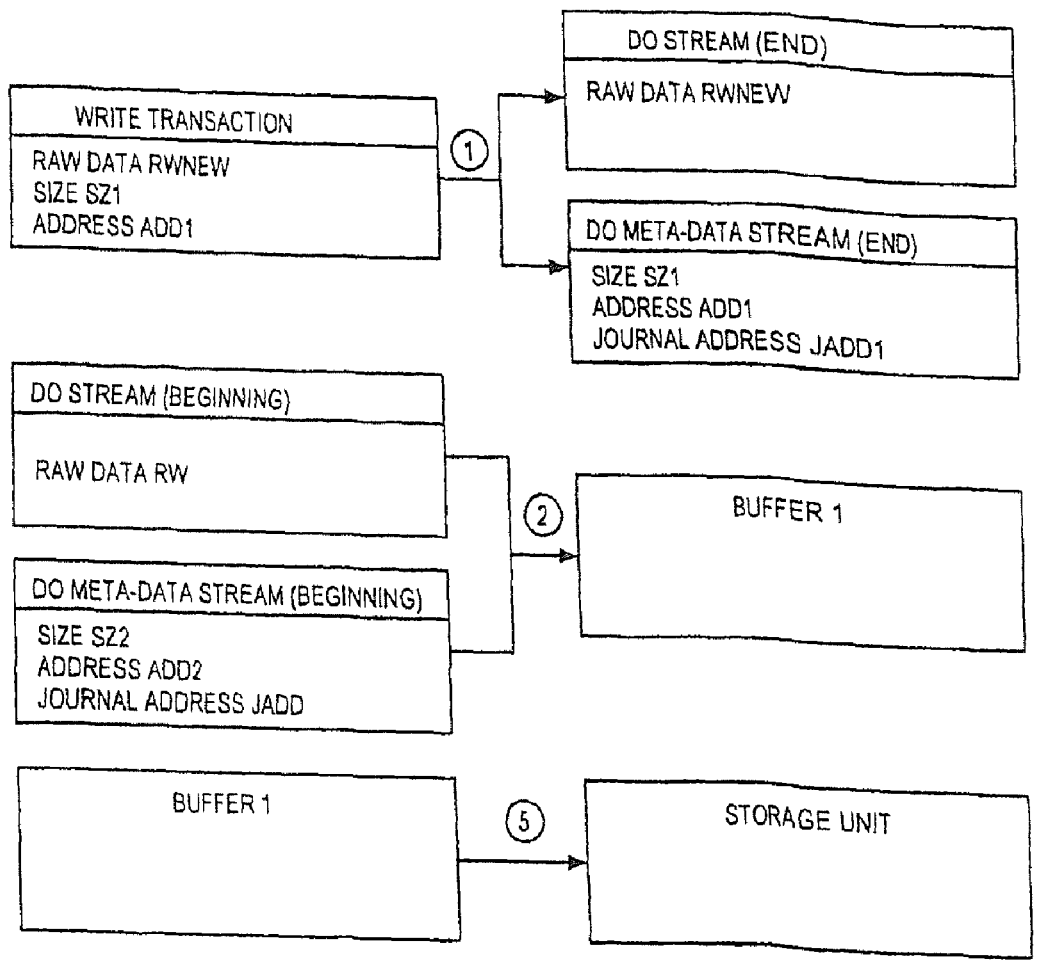
FIG. 10 is a simplified illustration of a three-stage journaling process for continuous data replication, for use when an I/O data rate is high.

Reference is now made to FIG. 10, which is a simplified illustration of a 3-stage journaling process for continuous data replication, for use when the DO stream is near its maximum capacity.

TABLE VII summarizes the relative pros and cons of each of the journaling processes described hereinabove.

TABLE VII

Pros and Cons of Journaling Processes

| Journaling Process | Pros | Cons |
| --- | --- | --- |
| 3-Stage Journaling | Fastest replication time | Long time to recover to current time |
| 4-Stage Journaling | Moderate replication time; Full data recovery capability | Only able to be used as long as the beginning and the end of the DO stream are close |

TABLE VII-continued

Pros and Cons of Journaling Processes

| Journaling Process | Pros | Cons |
| --- | --- | --- |
| 5-Stage Journaling | Full data recovery capability | Slowest replication time |

One data replication strategy is the set of automated rules for controlling when a data replication system transitions between 5-stage, 4-stage and 3-stage journal processing. As mentioned hereinabove, transitions from 5-stage to 3-stage journaling, and from 3-stage back to 5-stage journaling, may be controlled based on the current size of the DO stream. Transitions from 5-stage to 4-stage journaling may be automated to occur when the beginning and end of the DO stream are close; and transitions from 4-stage back to 5-stage journaling may be automated to occur when the memory queue reaches its capacity.

Figure 11:
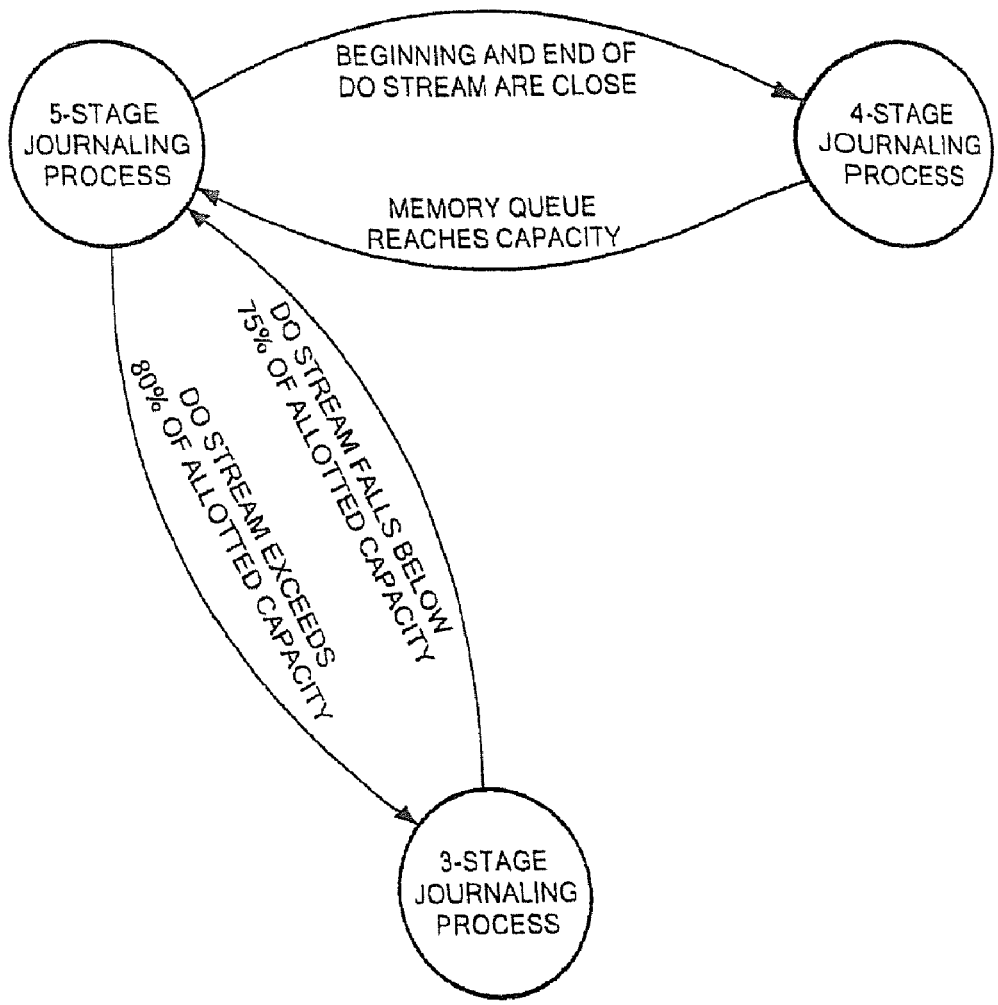
FIG. 11 is a simplified state diagram of transitions between 5-stage, 4-stage and 3-stage journal processing.

Reference is now made to FIG. 11, which is a simplified state diagram of transitions between 5-stage, 4-stage and 3-stage journal processing. Shown in FIG. 11 are three nodes, representing each of the journaling processes, and directed edges between the nodes corresponding to rules that govern transitions therebetween. As shown in FIG. 11, a 5-stage to 3-stage transition occurs when the size of the DO stream exceeds 80% of its allotted capacity, and a 3-stage to 5-stage transition occurs when the size of the DO stream falls under 75% of its allotted capacity. Similarly, a 5-stage to 4-stage transition occurs when the beginning and end of the DO stream are close; and a 4-stage to 5-stage transition occurs when the memory queue reaches its capacity.

It will be appreciated by those skilled in the art that using 4-stage journaling enables a data replication system to keep pace with higher I/O rates than can be handled when using 5-stage journaling. If the system is currently using 5-stage journaling and the I/O rate is higher than can be handled, a lag increases until the system necessarily transitions to the 3-stage journaling process. However, if the system can catch up with the lag, empty the DO stream and transition to a 4-stage journaling process, then the system can accommodate higher I/O rates before transitioning back to the 5-stage journaling process.

In this regard, it is noted that in general, if the system cannot keep pace with I/O rates using a 4-stage journaling process, then it most probably cannot keep pace using a 5-stage journaling process, and in either case the system would have to transition to a 3-stage journaling process. However, since the I/O rate changes continuously, a transition from 4-stage journaling to 5-stage journaling does not necessarily push the system to 3-stage journaling.

Figure 12:
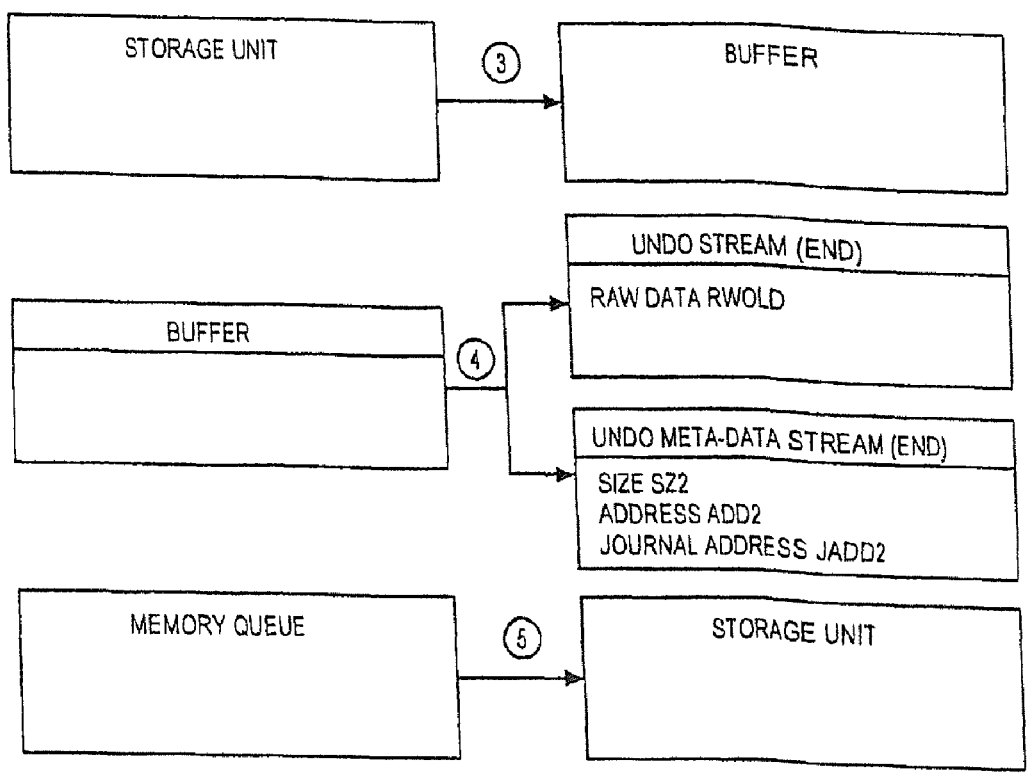
FIG. 12 is a simplified illustration of a variant of the three-stage journaling process shown in FIG. 10.

Reference is now made to FIG. 12, which is a simplified illustration of a variant of the three-stage journaling process shown in FIG. 10. The alternative 3-stage journaling proceeds according to the last three stages of the 4-stage journaling process. That is, the stage of writing to the DO stream is skipped within 4-stage journaling, for the alternative embodiment of 3-stage journaling. When performing 4-stage journaling, the backup site DPA (element 124 of FIG. 1) can return an acknowledgement to the production site DPA (element 112 of FIG. 1) immediately after the first stage, when the write transaction is written to the DO stream. However, when performing the alternative 3-stage journaling, the backup site DPA must wait until the write transaction is written to storage, before it can return an acknowledgement to the production site DPA. Since the last three stages of 4-stage journaling can be performed in a separate thread than the thread that performs the first stage, the alternative 3-stage journaling may result in a longer time lag between the source and target sites.

In another aspect, during the initialization process to synchronize first and second volumes a map is generated to identify changes between a current volume state and the most updated state. The map is used to enable signature testing only on locations where the volume is updated.

A delta marker stream contains the locations that may be different between the latest I/O data which arrived to the remote side (the current remote site) and the latest I/O data which arrived at the local side. In particular, the delta marking stream includes metadata of the differences between the source side and the target side. For example, every I/O reaching the data protection appliance for the source 112 is written to the delta marking stream and data is freed from the delta marking stream when the data safely arrives at both the source volume of replication 108 and the remote journal 180 (e.g. DO stream). Specifically, during an initialization process no data is freed from the delta marking stream; and only when the initialization process is completed and I/O data has arrived to both local storage and the remote journal data is I/O data from the delta marking stream freed. When the source and target are not synchronized, data is not freed from the delta marking stream. The initialization process starts by merging delta marking streams of the target and the source so that the delta marking stream includes a list of all different locations between local and remote sites. For example, a delta marking stream at the target might have data too if a user has accessed an image at the target site.

The initialization process creates one virtual disk out of all the available user volumes. The virtual space is divided into a selected number of portions depending upon the amount of data needed to be synchronized. A list of 'dirty' blocks is read from the delta marker stream that is relevant to the area currently being synchronized to enable creation of a dirty location data structure. The system begins synchronizing units of data, where a unit of data is a constant amount of dirty data, e.g., a data that needs to be synchronized.

The dirty location data structure provides a list of dirty location until the amount of dirty location is equal to the unit size or until there is no data left. The system begins a so-called ping pong process to synchronize the data.

Figure 13:
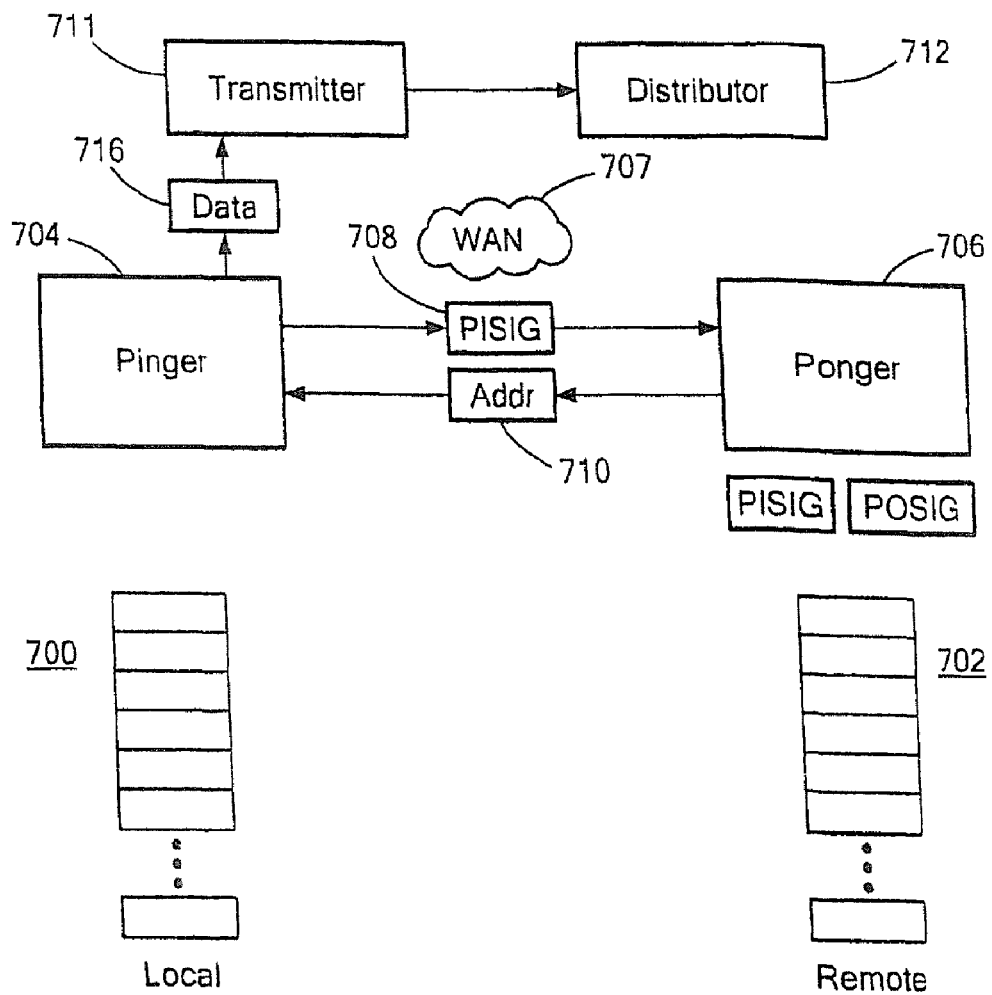
FIG. 13 is a schematic depiction of a volume synchronization environment.

FIG. 13 shows an exemplary synchronization environment in accordance with exemplary embodiments. During initialization, a first volume 700, such as a local volume (e.g., at the source side), is synchronized with a second volume 602, such as a remote volume (e.g., at the target side). A pinger module 704 on the local appliance 112 and a ponger module 706 on the remote appliance 124 examine data and selectively exchange information to efficiently perform initialization for making data in a remote site identical to data in a local site before replicating data in the remote volume. The local user volume 700 interacts with the pinger module 704, which is coupled to a WAN 707. The remote user volume 702 interacts with the ponger module 706.

In general, the pinger module 704 reads data from a part of the local user volume 700, signs the data (i.e. calculates a hash function of the data), and transmits the signature 708 to the ponger module 706. The ponger module 706 reads from the same part of the remote user volume 702, signs the data, and compares the signatures. The ponger module 706 transmits to the pinger module 704 addresses 710 of the user volume blocks where data differs. If there are differences, the pinger module 704 again reads the data from the local user volume 700 and transmits the data 716 to the distributor 712 on the remote side through a transmitter 711.

As shown in FIG. 14, during initialization process, the distributor 712 processes initialization data from the pinger module 704, which is written to the DO stream 750 while application data arriving in the local site is written to a temporary initialization stream 752. When the initialization data has been sent, the initialization stream 752 and the DO stream 750 are united to create an initialization snapshot and then the data is written to the user volume 700.

Some simplifications are made for the above description. A signature is used only if calculation of data reduction shows that signature usage saves bandwidth. In addition, the signature replacement process can be layered (i.e., calculate all the signature for the unit but at the beginning send only aggregated signatures from local to remote e.g., send a signature for every 256 blocks, then on the remote if the signature on all 256 block is different, check only for the block signature on one block level).

There are a number of reasons to use data signatures for initialization. Bandwidth is saved if local and remote volumes are almost identical, which can happen either if remote storage was restored from backup, or if a disaster causes a loss of markers. Journal space is also saved by using signatures.

However, signatures can be used only if remote user volumes are updated with the latest image. Conventional systems do not use signatures if the remote copy is not updated to the last image. The remote copy may not be the latest for a number of reasons, such as a user being mounted on a point-in-time image at the remote site, a stoppage of the initialization process, and period in which the system could not handle I/Os in five phase distribution so that a gap is created between the latest image in the journal and the latest image in the user volume, as described in detail above.

In one aspect, when the initialization process begins, if signature usage is not allowed, such as described above, a dirty location map is created to identify locations for which distribution from the DO stream to the UNDO stream has not yet taken place (or data written during logged access mode to the TSP stream). In one embodiment, the dirty location map is generated from the DO metadata stream and the TSP metadata stream. When the dirty location map is ready, the system can begin using data signatures to compare data between local and remote volumes. Signatures are not used for locations in the dirty location map. In addition, if a point-in-time image is currently mounted or being mounted, the dirty location map is updated with any I/O write operations.

Figure 15:
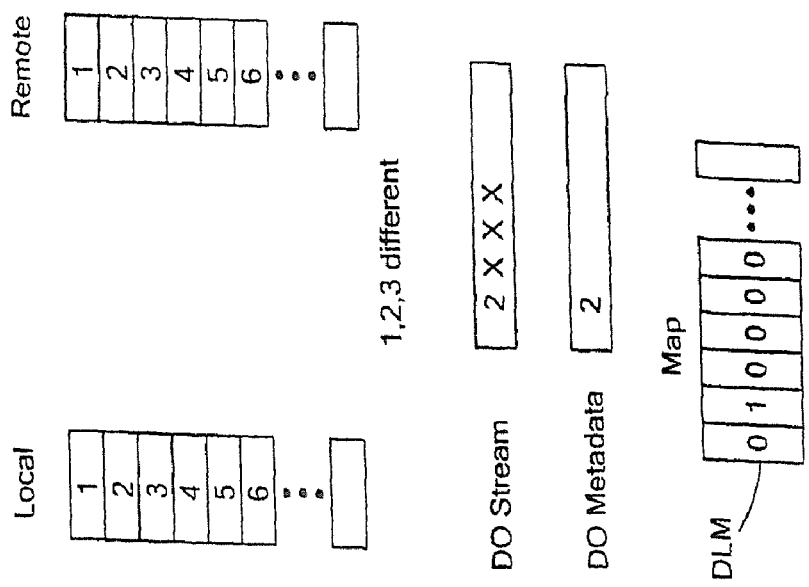
FIG. 15 is a schematic depiction of dirty location map generation as part of volume synchronization.

FIG. 15 shows an example of a dirty location map generation. A first volume V1 has blocks 1-6 and a second volume V2 has corresponding blocks 1-6. It is determined that blocks 1, 2, and 3 of the local and remote volumes have differences that need to be addressed for initialization.

The DO stream contains a series of entries including an entry for block 2, which has not yet been distributed. A corresponding entry for block 2 is contained in the DO metadata stream. In the present example, only block 2, of differing blocks 1-3, has an entry in the DO stream, and thus, signatures should not be used for block 2.

A dirty location map (DLM) is generated from the DO metadata stream. Only the entry for block 2 is set for blocks 1-6 of the volumes since block 2 is the only block contained in the DO metadata stream. In this example, a logical ONE is set in the dirty location map DLM for locations having entries in the DO stream.

In the present example, blocks 1, 2, and 3 were found to have differences to be addressed during initialization. Block 2 has an entry in the DO stream, which is reflected in the dirty location bit map DLM. Thus, a data signature for block 2 should not be sent. However, data signatures can be sent for blocks 1 and 3.

Figure 16:
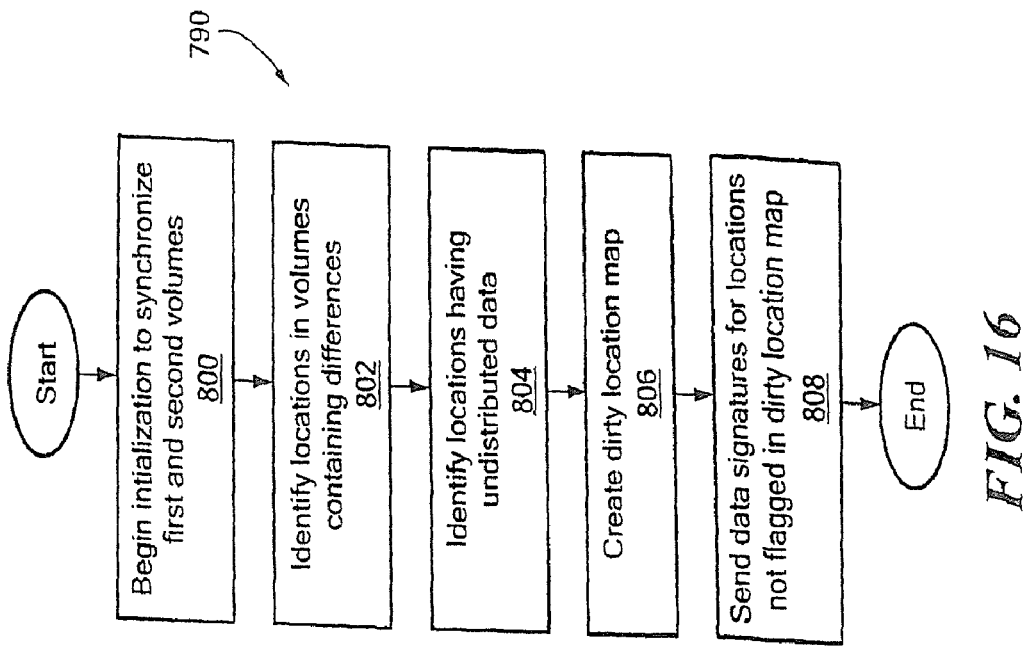
FIG. 16 is a flow diagram showing an exemplary sequence of steps for volume synchronization with selective data signature transmission.

FIG. 16 shows an exemplary process, an initialization process 790, for implementing selective signature transmission for initialization in a continuous data protection system in accordance with exemplary embodiments described herein.

In a process step 800, the initialization process 790 begins to synchronize first and second volumes from a local (source) and a remote (target) sides. In process step 802, differences between blocks in a first volume and corresponding blocks in a second volume are identified. In process step 804, a data stream containing data that has not been distributed to/from the data volumes is examined to identify locations for data distribution. In an exemplary embodiment, the DO metadata stream is examined to identify the locations.

In process step 806, a dirty location map is created in which locations contained in the DO metadata stream are flagged. In an exemplary embodiment, the dirty location map provides a bitmap where each bit corresponds to block. In other embodiments, a bit corresponds to a number of disk blocks. The dirty location map is used such that for flagged locations data signatures are not sent during the initialization process. Data signatures can be used for non-flagged locations. In process step 808, data signatures are sent for locations not flagged in the dirty location map as part of the volume synchronization process.

It is understood that the initialization process can occur while a user is currently mounting an old point-in-time. During the mount time, data is distributed from the undo stream to the DO stream, this process can happen while the initialization process is actually running, meaning, the do stream actually grows and contains more data during the initialization. When data moves from the UNDO stream to the user volume and the redo data is written to the DO stream, the user volume gets less updated and the system needs to add the locations to the dirty location bitmap, so every redo data written to the DO stream updates the bitmap It is further understood that when the user is already mounted on a point-in-time in a logged access mode (TSP mode), for every I/O the user writes the system first writes the UNDO data for the I/O.

As previously described in FIGS. 1 to 16, the protection agents (splitters) (e.g., the protections agent 144 and the protection agent 164) are located at the host. It would be beneficial for these splitters to be located at the storage array 108 or 120 since the array could come with a splitter pre installed. Typically the number of hosts is significantly higher than the number of storage arrays. Thus, it is easier to manage the splitter at the storage array than at the host. Also, since the number of software components available for the storage arrays is much smaller, it is easier to make a splitter more stable in the storage array. For example, each system can have different device drivers installed which are not compatible with a protection agent located at the host. However, placing a splitter at the storage array is non obvious and difficult to develop.

Figure 17:
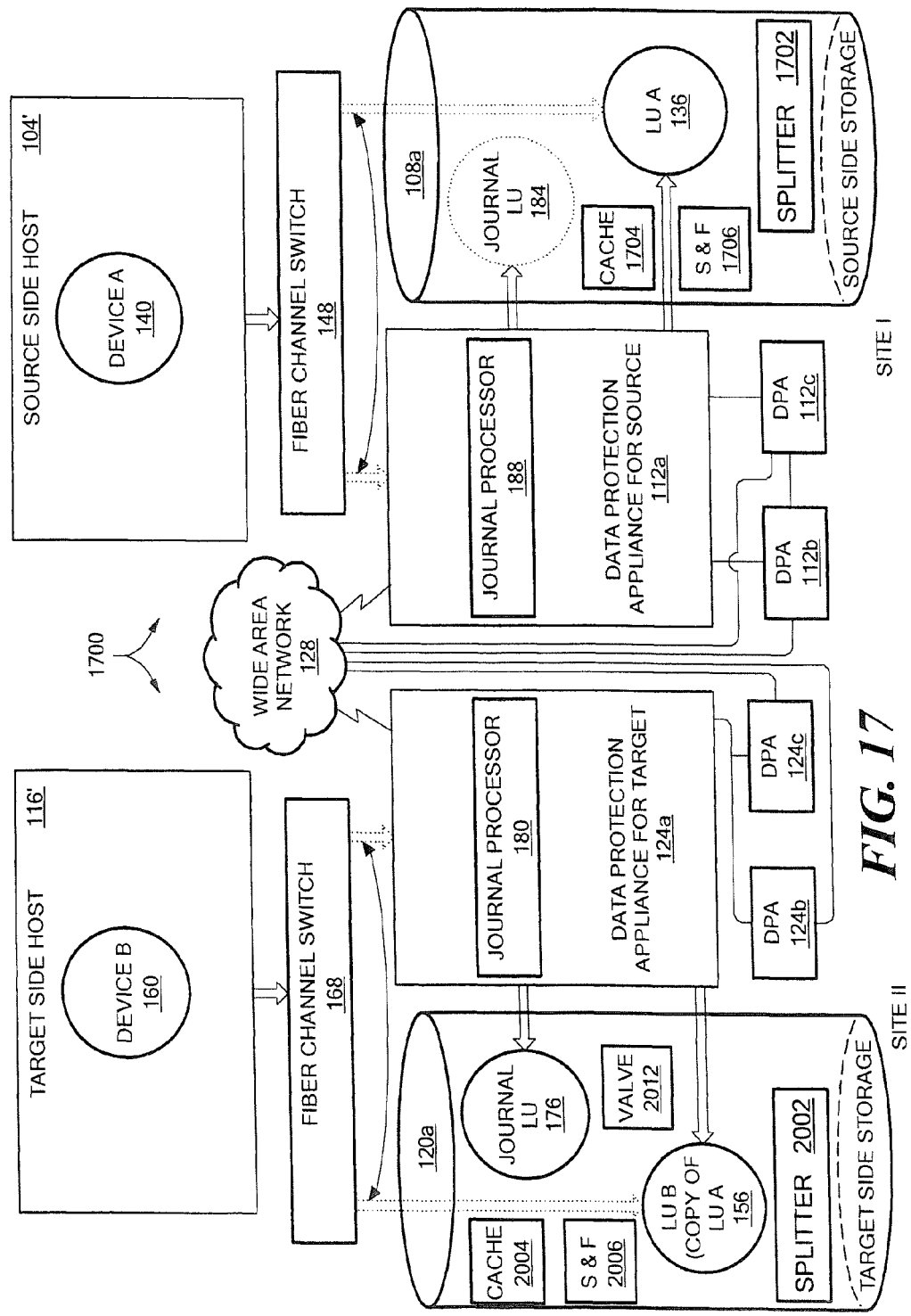
FIG. 17 is a block diagram of another example of the data protection system.

Referring to FIG. 17, a data protection system 1700 includes the source-side host 104' similar to source-side host 104 but without the protection agent 144. The system 1700 also includes a source side storage 108a, similar to the source-side storage 108 but with a splitter 1702 (also referred to herein as an ORS (Open Replicator Splitter) splitter), a cache 1704, and a store and forward (S&F) buffer 1706. The system 1700 further includes a DPA 112a similar in functionality to the DPA 112, for example and includes a journal processor

188. In some example, the source side may include one or more storage arrays like array 108*a*.

The system 1700 further includes a target side storage 124*a*, similar to the target side storage 124 but with a splitter 2002 (an ORS splitter), a cache 2004, and a store and forward (S&F) buffer 2006. In other examples, the target side may have a different splitter type, for instance, a host splitter or a switch based splitter. The system 1700 further includes a DPA 124*a* similar in functionality to the DPA 124, for example and includes a journal processor 176.

The data protection system 1700 further includes a first cluster of DPAs which includes the DPA 112*a* as well as a DPA 112*b* and a DPA 112*c* and a second cluster of DPAs which includes DPA 124*a* as well as a DPA 124*b* and a DPA 124*c*.

In other examples, there may be two or more than three DPAs in each cluster. In one example, the DPAs 112*a*-112*c* are connected to a storage array 108*a* through a switch (not shown) and DPAs 112*a*-112*c* are connected to a storage array 120*a* through a switch (not shown). In another example, the DPAs in the first or second cluster are connected to the same one or more than one storage array in a storage area network. Each of the DPAs 112*a*-112*c* is connected to the DPAs 124*a*-124*c* through the WAN 128.

As will be further described, the splitter-1702 may be used to replicate data through the DPAs 112*a*-112*c* asynchronously or synchronously. The splitter 1702 can also be used in failover. As used herein, the splitter functions in at least two modes. A first mode, a source side protection (SSP) mode, is when the source side data is mirrored and a second mode, a target side protection (TSP) mode, is when the target side is used to access a point-in-time.

When an I/O arrives to a volume (e.g., a volume V (not shown)) in the storage array 108*a* which has the splitter 1702 in an SSP active state (e.g., SSP active state 1806 in FIG. 18), the I/Os will be sent to the DPA (e.g., DPA 112*a*) exposing (e.g., making available) the target (e.g., a LUN V'(not shown)) to the splitter 1702. The DPA 112*a* will mirror the I/O metadata to another DPA (e.g., DPA 112*b* or 112*c*). The DPA 112*a* will send a transfer ready command to the splitter 1702 and the splitter 1702 will then send the I/O write data to LUN V' exposed by the DPA 112*a*. When data arrives it will be handled as previously described (see, for example, FIGS. 1 to 16) depending on the replication mode (e.g., synchronous mode, asynchronous mode, snapshot mode and so forth), and journaled at the journal 176 at the replication site by the DPA 124*a* as also described above.

In one example, the ORS splitter 1702 has at least the following modes:

CONTINUOUS_PUSH: In this mode there is a device (e.g., LUN A 136) and the data of the device is pushed continuously to another device (e.g., LUN B (156)). Any I/Os written to LUN A will be written by the ORS splitter to the LUN B while in continuous push mode. The ORS splitter includes a protection bitmap, which includes a bit for every track (64 KB). When the ORS splitter (e.g., the splitter 1702) fails to send the I/O to the other device (LUN B), the ORS session will fail and all I/Os will be tracked in the protection bitmap. The I/Os to LUN A will continue to be served with no disruption.

When the ORS session is re-established in a continuous push mode, all the tracks which are dirty according the protection bitmap will be re-pushed to LUN B using a background process. The I/O flow in a continuous push mode is described in detail below. The continuous push mode can work in two replication modes:

1. Synchronous replication mode: the ORS splitter will try to push the write or track data to the DPA exposed LUN B (for example, 11 seconds). After every failure the ORS splitter will try to discover another path to the DPA LUN (the DPA LUN may move to another DPA if the DPA exposing the LUN failed. Re discovering the path will allow the ORS splitter to write to the new DPA. The same is true if one path failed to the DPA, then the splitter will find another path to the same DPA). If it does not succeed within the allowed time, the host write is accepted and ORS session goes to a FAILED mode and tracks new host writes.

2. Asynchronous replication mode: the ORS splitter tries to write to DPA exposed LUN B once and if the write is not successful session goes to a FAILED mode and tracks host writes.

ALPO (always push old data) mode: In this mode, there is a production device (e.g., LUN A) and a target device (e.g., LUN B). For every write arriving to LUN A, at an offset x of a size y, the current data at the offset x of the size y will be pushed to LUN B (exposed by the remote site DPA). When the I/O transfer to the LUN B is complete, the storage array 108*a* will send a transfer ready message to the host 104' writing to LUN A and the new data will be written to LUN A.

As used herein, an ORS session is a connection between a target and a source LUN. The ORS session can be in one of the following modes:

CREATED—ORS session is created but is not active. This is an intermediate state and is followed by an activate command.

SYNC_IN_PROGRESS—ORS session is activated, i.e., a foreground copy is active (every I/O reaching the source device is pushed to the target device), the protection bit map is not empty so data is being copied in the background from the source LUN to the target LUN.

SYNCHRONIZED—ORS session is activated, i.e., the foreground copy is active and all the data marked dirty in the protection bit map was pushed to the target device.

FAILED—ORS session has experienced an I/O failure any I/O arriving will be tracked on the protection bitmap.

STOPPED—ORS session foreground and background processing is not active.

(Foreground copy means that at any host the I/Os are being pushed to the target device; and background copy means that when there are dirty locations in the protection bitmap the I/Os are being pushed to the target device) any JO to the device is tracked in the protection bitmap.

Figure 18:
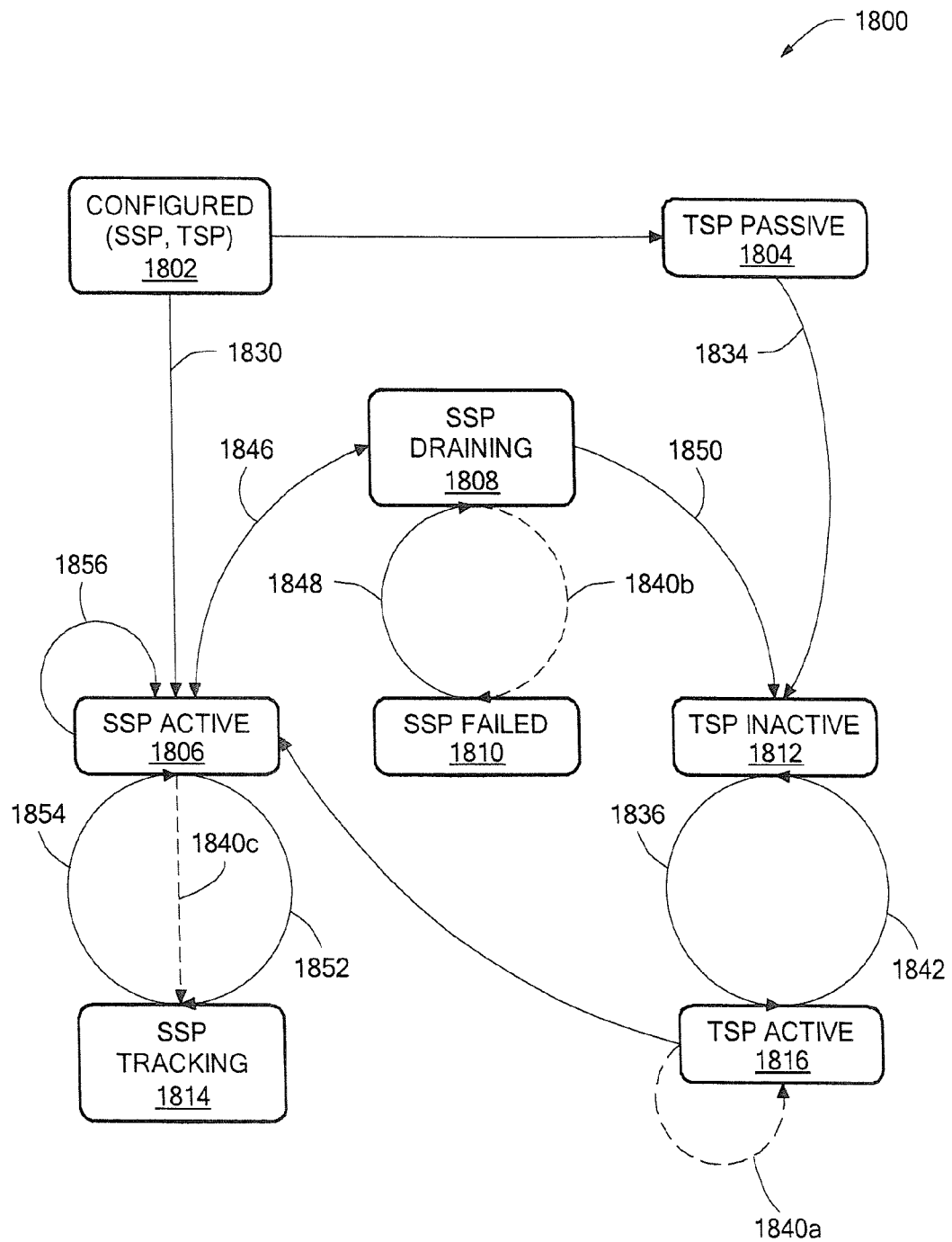
FIG. 18 is a block diagram of states of a splitter.

Referring to FIG. 18, a state diagram 1800 indicates various states of the splitter 1702. The states include but are not limited to a configured state 1802, a TSP passive state 1804, a SSP active state 1806, an SSP draining state 1808, an SSP failed state 1810, a TSP inactive state 1812, an SSP tracking state 1814 and a TSP active state 1816. If the source device is on the storage array and is the source device for ORS, then DPA 112 will expose a target device which will be target for the ORS session. The DPA 112*a* will send the I/Os to the remote DPA 124*a*, and I/Os will be written to the final target device on the storage array 120 on the remote site which is the target of replication as described in FIGS. 1 to 16.

The configured state 1802 indicates that a replication session in the splitter 1702 is configured (e.g., by a DPA) for the TSP and SSP modes. The session includes a source device (e.g., a device in the storage array) and a target device (e.g., a virtual device which the DPA will expose and will be used in order to replicate data from the source device on the array to a target device on another storage array). In one example, there is a target device for the ORS splitter 1702 which is a virtual device, and there is the real target device which the ORS splitter 1702 is not aware of and can reside on a different site.

The splitter 1702 can transition from the configured state 1802 to the SSP active state 1806 through the use of a SSP activate command (e.g., issued by DPA 112*a*) (1830). In one example, the DPA 112*a* performs the following:
1) The DPA 112*a* will expose a device B and map and unmask the device for ORS discovery
2) Create ORS Continuous push with Protection Clear (i.e., all bits the protection bitmap are 0) with Replication mode set to synchronous replication mode
    a. Discovery of Paths and Devices occurs during Create
3) Optionally set Replication mode to asynchronous replication mode
4) Activate ORS with Continuous Push This means ORS splitter is in continuous push mode, and the ORS session is in active mode (either synchronizing or synchronized)

When in SSP active state 1806 any I/O sent to the source ORS device will be also pushed immediately to the ORS target device exposed by the DPA 112*a*.

The splitter 1702 can also transition from the configured state 1802 to the TSP passive state 1804 through a TSP passive command 1804 (e.g., issued by the DPA 112*a*) which sets the source device to a passive mode which means reads and write from the hosts (except the DPA 112*a*, 112*b*, 112*c*) to the device are failed but the device can be seen by the host 104' and respond to SCSI inquiries (1832). In the TSP passive state 1804, the target device is passive and no I/Os can be sent to the device, except I/Os created by the DPA.

The splitter 1702 transitions from the TSP passive state 1804 to the TSP inactive state 1812 through a TSP inactivate command (e.g., issued by DPA 112*a*) (1834). In the TSP inactive state 1812 the device in the storage array is passive. When moving to the TSP inactive state 1812 the DPA exposes the target device for the ORS session and the ORS splitter 1702 discovers the target device.

The process is as follows:
1) DPA 112*a* will expose a device B, the virtual device is mapped and unmasked for ORS Discovery
    a. ORS is created in the ALPO mode with a Protection Clear (i.e. all bits in the protection bitmap are 0, in ALPO mode protection bitmap is not used.)
    b. Discovery of Paths and Devices occurs during Create The means the ORS splitter is in ALPO mode, the ORS state is synchronized since the protection is always clear in ALPO mode, no IOs will arrive since device is in passive mode.

The splitter 1702 transitions from the TSP inactive state 1812 to the TSP active 1816 through a TSP activate command (1836). In the TSP active state 1816 the target device is active. The host can now generate I/Os to the ORS source device. In one example, the ORS source device is the target device for the total replication and TSP access happens at the remote site during replication.

Another important aspect is that replication can have just one type of splitter on one of the replication sites, i.e., an ORS splitter, and another type of splitter on the other site (for instance, a host splitter such as protection agent 144).

From the TSP active state 1816, the splitter 1702 can remain in the TSP active state 1816 if there is a write I/O failure (1840*a*). In one example, after an I/O failure or timeout in the TSP active state, the ORS splitter will rediscover the path to the DPA exposed LUN, so that if the DPA exposing the LUN fails then another DPA will expose the LUN and the ORS splitter will rediscover it and be able to continue writing.

The splitter 1702 can transition back to the TSP inactive state 1812 if a TSP deactivate command is executed (1842) or transition to the SSP active command 1806 if a SSP switch is activated (1844).

In the SSP active state 1806, the splitter 1702 can transition to the SSP draining state 1808 when a SSP drain command is executed (1846). In order to move to SSP draining state 1808,
1. The source ORS device is set to passive mode (i.e., no more host I/Os are generated) and
2. The ORS splitter is set to the asynchronous replication mode in order to force handling of write errors and failures to be the same as in ASYNCHRONOUS mode.

The SSP draining state 1808 is used to make sure that all the I/Os that are dirty in the protection bitmap are pushed to the DPA before moving to the TSP inactive state 1812.

If there are write failures during the SSP draining state 1806, the splitter transitions from the SSP draining state 1808 to the SSP failed state 1810 (1840*b*). In the SSP failed state 1810, the target device is passive, continuous push is active but pushing the data has failed. (meaning the ORS session state has failed)

If the SSP recreate command is received, the SSP splitter 1702 transitions from the SSP failed state 1810 back to the SSP draining state 1808 (1848). In one example, the ORS splitter will first try to re-discover a path to the volume exposed by the DPA. If a path is found, the ORS splitter 1702 will move to the SSP draining state 1808; otherwise, it will remain in the SSP failed state 1810. If a TSP switch command is executed, the splitter 1702 transitions from the SSP draining state 1808 to the TSP inactive state 1812 (1850). In one example, the TSP switch command is executed if the ORS session is in the SYNCHRONIZED mode.

In the SSP active state 1806, the splitter 1702 can transition to the SSP tracking state 1814 if an SSP track command is executed (1852) (in this case ORS session state move to stopped mode) or if there is a write I/O failure (1840*c*), the ORS splitter 1702 determines that an I/O failed based on the replication mode. In the synchronous mode, the ORS splitter 1702 will try to write or track data to the DPA exposed LUN for 11 sec, for example. If it does not succeed, the host write is accepted and ORS session goes to the FAILED mode and tracks new host writes, and in asynchronous mode ORS will try to write to DPA exposed LUN once and if not successful session goes to the FAILED mode and tracks host writes.

When ORS session state moves from active to FAILED mode, the total state of the ORS splitter is the SSP tracking state.

The splitter 1702 can transition from the SSP tracking state 1814 back to the SSP active state 1806 if a SSP recreate command is executed (1854). In one example, the recreate command will rediscover the path to the device exposed by the DPA, if the path is found the splitter will move to the SSP active state 1806 otherwise it will remain in the SSP tracking state 1814. The rediscovery is used in case a path to the DPA is lost and another path is needed or if the DPA has failed and another DPA now exposes the LUN. In the SSP tracking state 1814, the target device is active, continuous push is active but pushing the I/O data is stopped or failed, and any I/O arriving to the source device of the ORS is tracked in the protection bitmap.

In the SSP active state 1806, the ORS splitter 1702 in the storage array 108*a* remains in the SSP active state 1806 if a set replication mode command (which changes the mode to synchronous or asynchronous) is executed (1856).

Referring to FIGS. 19A-19I, the ORS splitter 1702 in storage array 108*a* in conjunction with the host 104' and a virtual target 1900 exposed by the DPA can perform a number of different processes (e.g., the processes 1902-1918) while the splitter is in the SSP active state 1806. The splitter 1702 runs on the storage array 108a and any I/Os transferred to a volume where ORS is configured will be sent to the ORS target volume 1900 exposed by the DPA 112a (for every volume where the ORS splitter is configured, another volume with the same size and characteristics will be exposed by the DPA). The array 108a receives the I/Os. If the ORS session is configured it will handle the I/Os as described in FIGS. 19A-19I.

As used herein below, the write commands (host and track) are standard SCSI write commands).

Figure 19A:
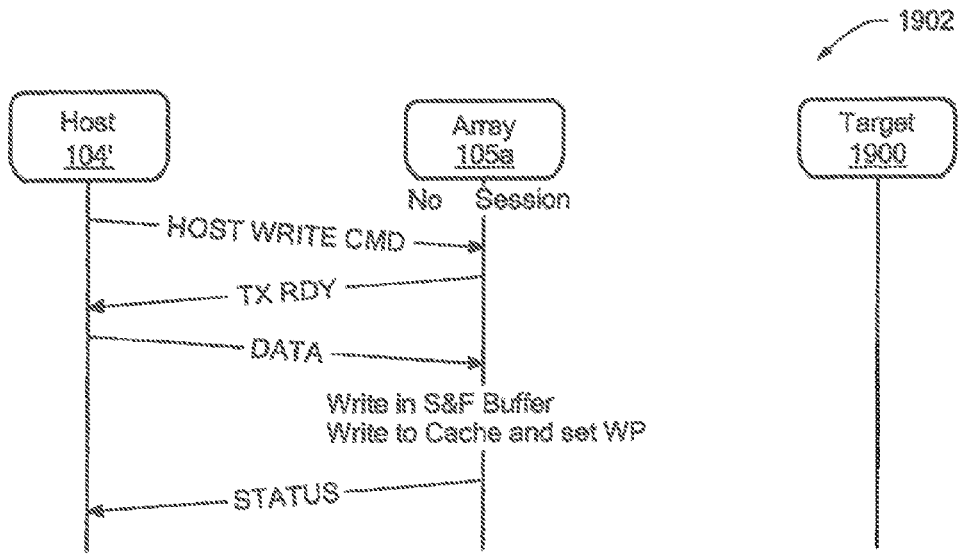
FIGS. 19A to 19I are sequence diagrams for a source side protection (SSP) active state.

In FIG. 19A, a process 1902 depicts using the storage array 108a when the ORS splitter 1702 is not configured. For example, the host 104' sends a host write command (HOST WRITE CMD) to the storage array 108a which returns a transfer ready message (TX RDY). The host 104' then sends the data to the array 108a which writes the data in a the S&F buffer 1706 in the storage array 108a, writes to the cache 1704 in the storage array 108a and sets write pending (WP). The array 108a returns a status message to the host 104'.

Figure 19B:
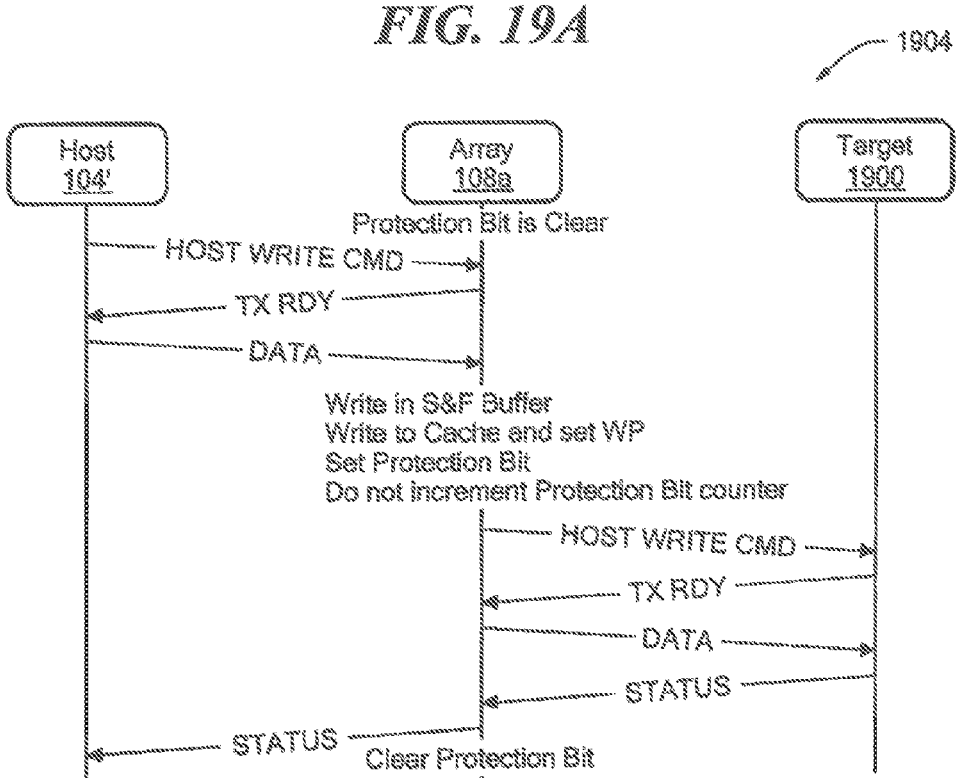

In FIG. 19B, a process 1904 is an example of a process used when the array 108a, when ORS session is configured and is in the SSP active state 1806. Initially, the protection bit is clear. The host 104' sends a host write command (HOST WRITE CMD) to the array 108a which returns a transfer ready message (TX RDY). The host 104' then sends the data to the array 108a which writes the data in the S&F buffer 1706, writes to the cache 1704 and sets WP. The protection bit is set.

The ORS continuous push splitter 1702 in the storage array 108a sends the host write command to the target 1900 exposed by the DPA 112a which returns a transfer ready message to the ORS splitter 1702. The ORS splitter 1702 sends the data to the target 1900, which returns a status message when the data is stored on the target 1900. The ORS splitter 1702 returns a status message to the host 104 that data transfer is complete. The protection bit is then cleared.

Figure 19C:
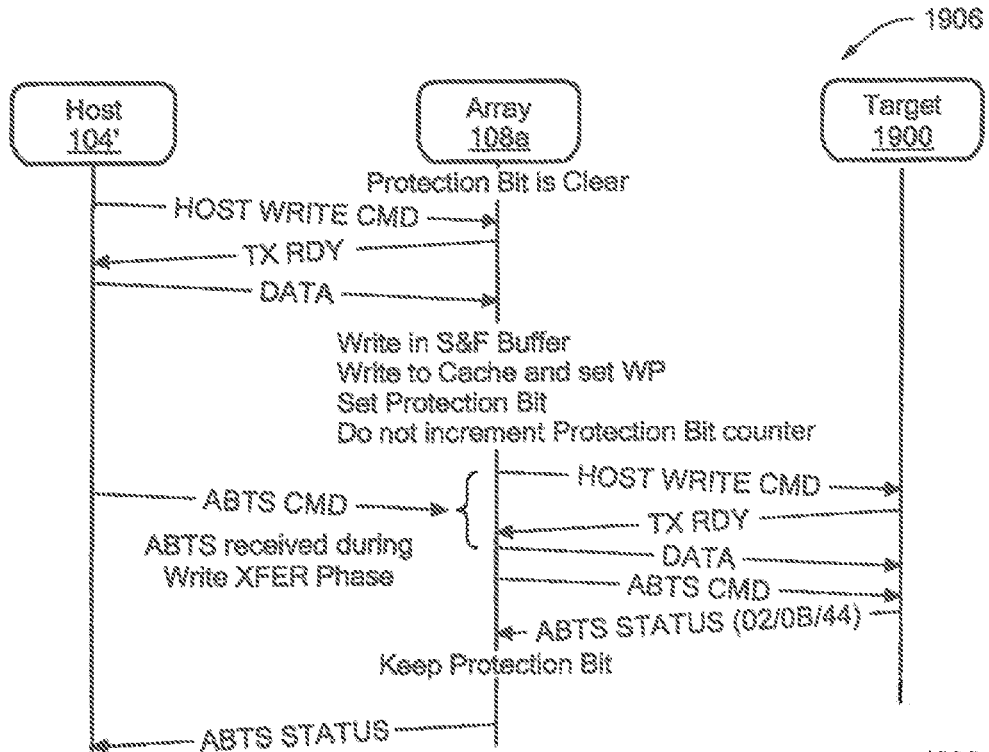

In FIG. 19C, a process 1906 is an example of a process used when the ORS splitter 1702 in array 108a is in the SSP active state 1806 and an abort command is sent by the host 104'. Initially, the protection bit is clear. The host 104' sends a host write command (HOST WRITE CMD) to the storage array 108a which returns a transfer ready message (TX RDY). The host 104' then sends the data to the splitter 1702 which writes the data in the S&F buffer 1706, writes to the cache 1704 and sets WP. The protection bit is set.

The ORS splitter 1702 in the array 108 sends a host write command to the target 1900 exposed by DPA 112a which returns a transfer ready message to the splitter 1702. The splitter 1702 in the array 108a sends the data to the target 1900 exposed by DPA 112a. If the host 104' sends an abort command (ABTS CMD) during the Write transfer phase, the splitter 1702 sends an abort command to the target 1900. The target 1900 returns an abort status message (ABTS STATUS) to the splitter 1702 in the array 108a. The protection bit remains set and the splitter 1702 in storage array 108a sends an abort status message (ABTS STATUS) to the host 104'. The ORS session then moves to SSP tracking state 1814.

Figure 19D:
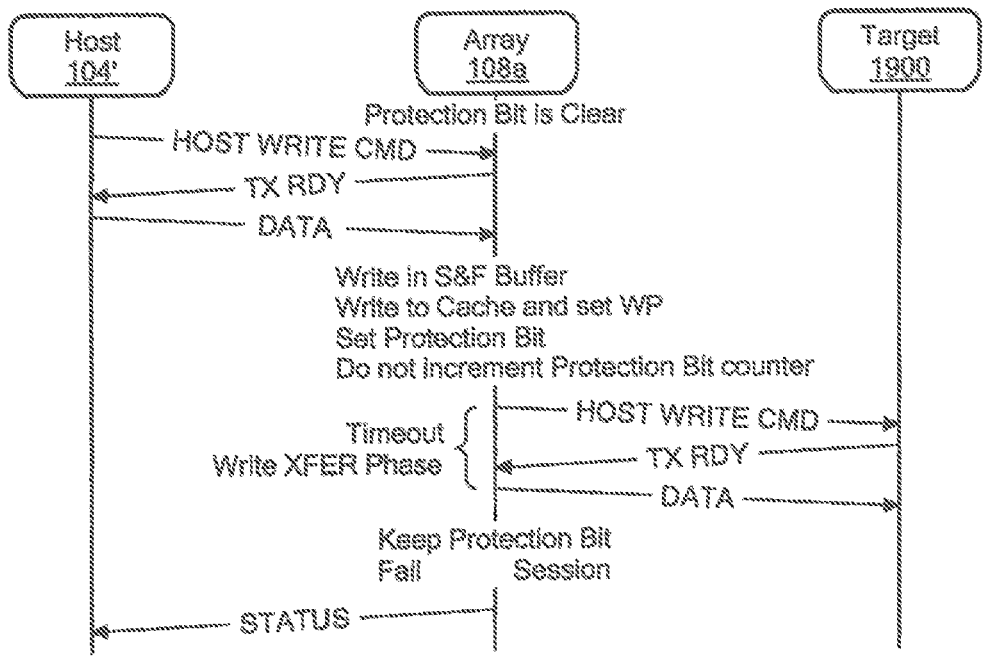

In FIG. 19D, a process 1908 is an example of a process used when the ORS splitter 1702 in the array 108a is in the SSP active state 1806 and data transfer times out. Initially, the protection bit is clear. The host 104' sends a host write command (HOST WRITE CMD) to the splitter 1702 which returns a transfer ready message (TX RDY). The host 104' then sends the data to the storage array 1700 which writes the data in the S&F buffer 1706, writes to the cache 1704 and sets WP. The protection bit is set The ORS splitter 1702 in array 108a sends a host write command to the target 1900 exposed by the DPA 112a which returns a transfer ready message to the splitter 1702. The splitter 1702 sends the data to the target 1900. If the write transfer to the target 1900 times out (e.g., after 15 seconds) without completing the data transfer to the target 1900, the protection bit remains set and the ORS session fails, and moves to the SSP tracking state 1814. The storage array 108a sends a status message to the host 104'.

Figure 19E:
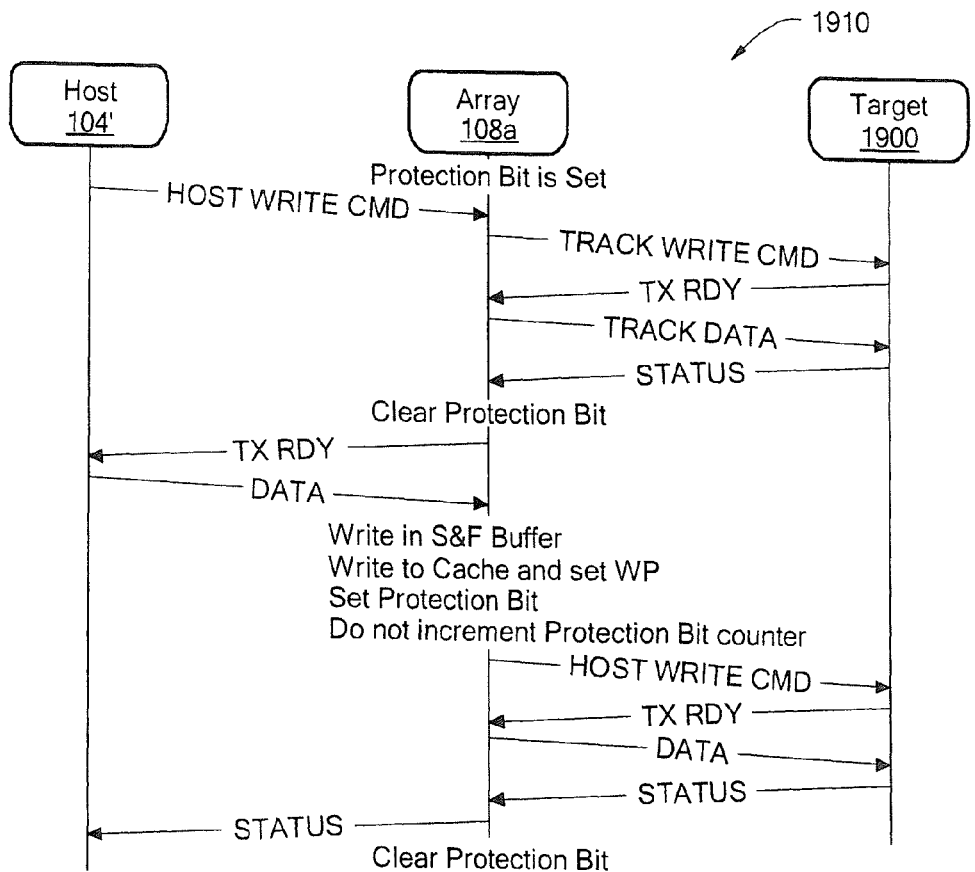

In FIG. 19E, a process 1910 is an example of a process used when the ORS splitter 1702 in storage array 108a is in the SSP active state 1806 and initially, the protection bit is set. The host 104' sends a host write command (HOST WRITE CMD) to the splitter 1702. The splitter 1702 sends a track write command (TRACK WRITE CMD) (i.e., the data currently on the storage for the track, e.g., all the 64 KB of the track) to the target 1900 exposed by the DPA, which returns a transfer ready (TX RDY) message. The ORS splitter 1702 in storage array 108a sends track data to the target 1900 exposed by DPA 112a, which returns a status message to the splitter 1702 and the protection bit cleared.

The storage array 108a returns a transfer ready message (TX RDY). The host 104' then sends the data to the splitter 1702 which writes the data in the S&F buffer 1706, writes to the cache 1704 and sets WP. The protection bit is set.

The ORS splitter 1702 in the array 108a sends a host write command to the target 1900 which returns a transfer ready message to the splitter 1702. The splitter 1702 sends the data to the target 1900 exposed by the DPA 112a. The target 1900 sends a status message to the ORS splitter in storage array 108a. The storage array 108a sends a status message to the host 104 and the protection bit is cleared.

Figure 19F:
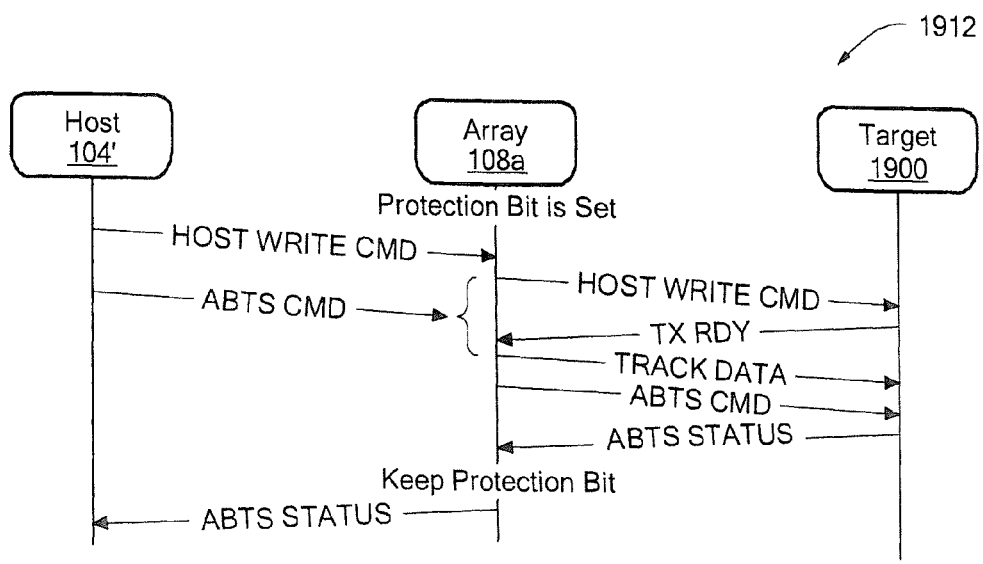

In FIG. 19F, a process 1912 is an example of a process used when the ORS splitter in storage array 108a is in the SSP active state 1806 and an abort command is received during track write. The host 104' sends a host write command (HOST WRITE CMD) to the splitter 1702. The splitter 1702 sends track write command (TRACK WRITE CMD) to the target 1900 exposed by DPA 112a, which returns a transfer ready (TX RDY) message. The ORS splitter 1702 in storage array 108a sends track data to the target 1900. If an abort command (ABTS CMD) is sent from the host 104' to the storage array 108' during the track write, the ORS splitter 1702 in storage array 108a sends an abort command (ABTS CMD) to target 1900 exposed by DPA 112a. The target 1900 returns an abort status message (ABTS STATUS) to the splitter 1702. The protection bit remains set and the storage array 108' sends an abort status message (ABTS STATUS) to the host 104'. The splitter 1702 moves to the SSP tracking state 1814.

Figure 19G:
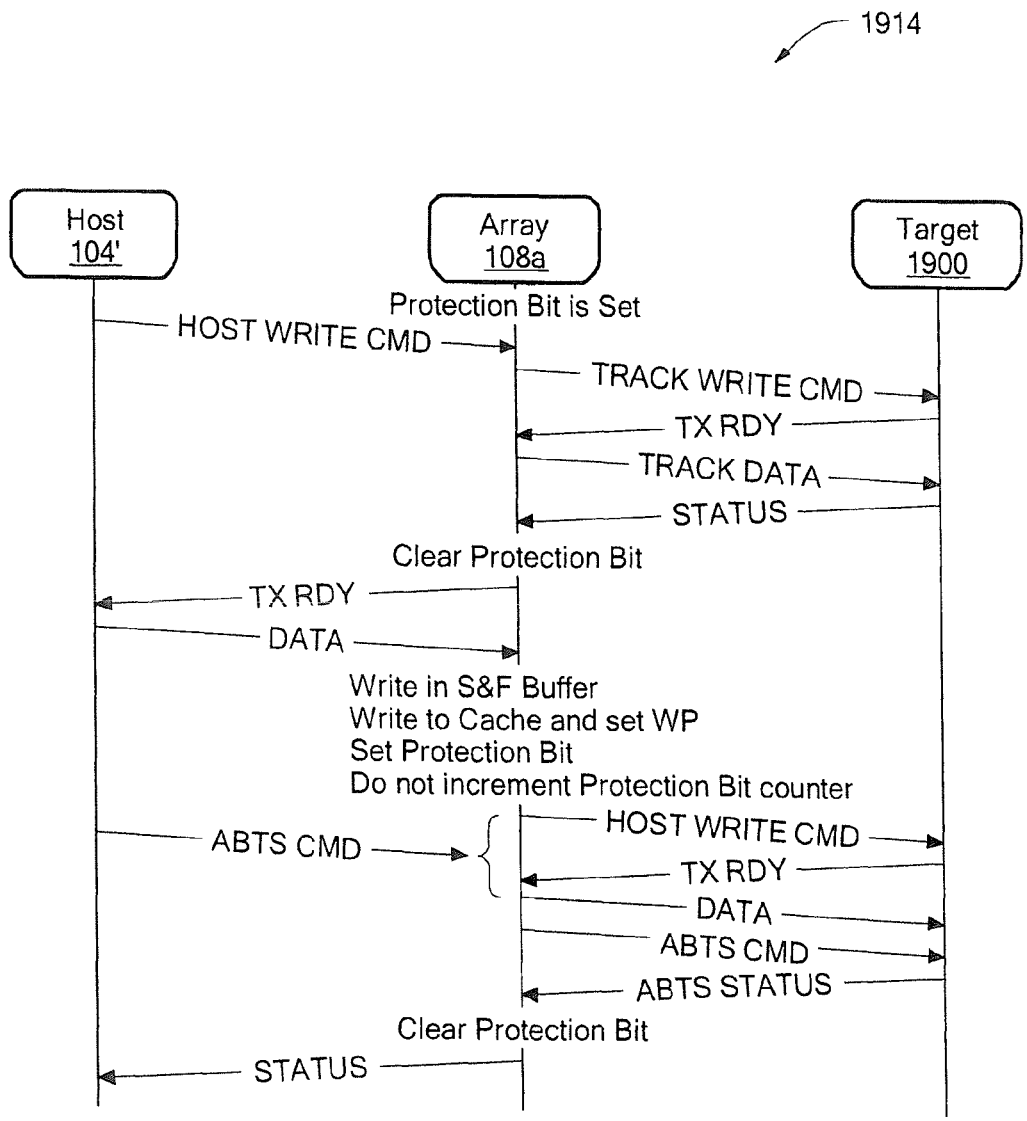

In FIG. 19G, a process 1910 is an example of a process used when the ORS splitter 1702 in the storage array 108a is in the SSP active state 1806 and an abort command is received during the host data transfer. Initially, the protection bit is set. The host 104' sends a host write command (HOST WRITE CMD) to the storage array 108a. The ORS splitter 1702 in the storage array 108a sends a track write command (TRACK WRITE CMD) to the target 1900 exposed by the DPA 112a, which returns a transfer ready (TX RDY) message. The ORS splitter 1702 in the storage array 108a sends track data to the target 1900, which returns a status message to the ORS splitter 1702 in the storage array 108a. The protection bit then cleared.

The storage array 108a returns a transfer ready message (TX RDY). The host 104' then sends the data to the splitter 1702 which writes the data to the S&F buffer 1706, writes to a cache 1704 and sets WP. The protection bit is set and a protection bit counter is not incremented.

The ORS splitter 1702 in storage array 108*a* sends host write command (HOST WRITE CMD) to the target 1900 exposed by DPA 112*a*, which returns a transfer ready (TX RDY) message. The ORS splitter 1702 in the storage array 108*a* sends data to the target 1900 that is exposed by DPA 112*a*. If an abort command (ABTS CMD) is sent from the host 104' to the ORS splitter 1702 in storage array 108*a* during the host data transfer, the ORS splitter 1702 in the storage array 108*a* sends an abort command (ABTS CMD) to target 1900. The target 1900 returns an abort status message (ABTS STATUS) to the ORS splitter 1702 in the array 108*a*. The protection bit is not cleared and the storage 108*a* sends a status message to the host 104', the ORS splitter 1702 moves to SSP tracking state 1814.

Figure 19H:
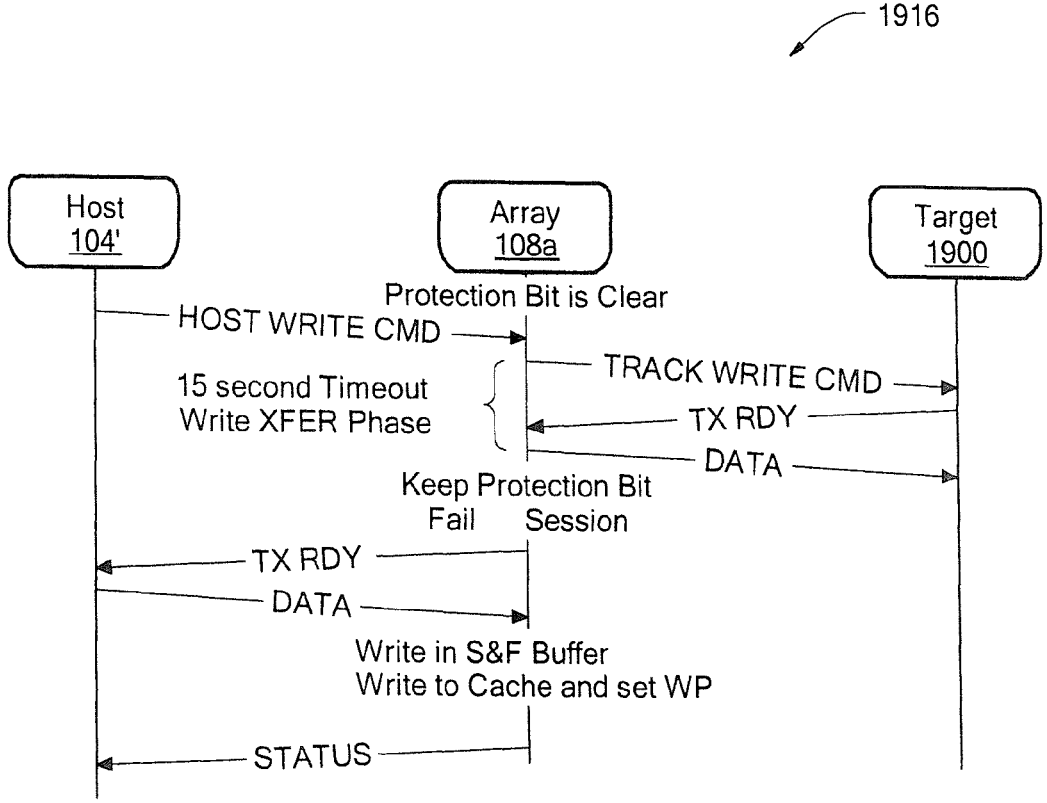

In FIG. 19H, a process 1916 is an example of a process used when the ORS splitter 1702 is in the SSP active state 1806 and a timeout occurs during a track write transfer. Initially, the protection bit is set. The host 104' sends a host write command (HOST WRITE CMD) to the storage array 108*a*. The ORS splitter 1702 in the storage array 108*a* sends track write command (TRACK WRITE CMD) to the target 1900 exposed by DPA 112*a*, which returns a transfer ready (TX RDY) message. The ORS splitter 1702 in storage array 108*a* sends track data to the target 1900. If a timeout occurs during the track write transfer (e.g., after 15 seconds), the protection bit is kept and the replication session is failed, i.e., the ORS splitter 1702 moves to the SSP tracking state 1814. The storage array 108*a* sends a transfer ready message to the host 104' and the host sends data to the storage array 108*a*. The data is written to the S&F buffer 1706 and to the cache 1704 and WP is set. The splitter 1702 returns a status message to the host 104'.

Figure 19I:
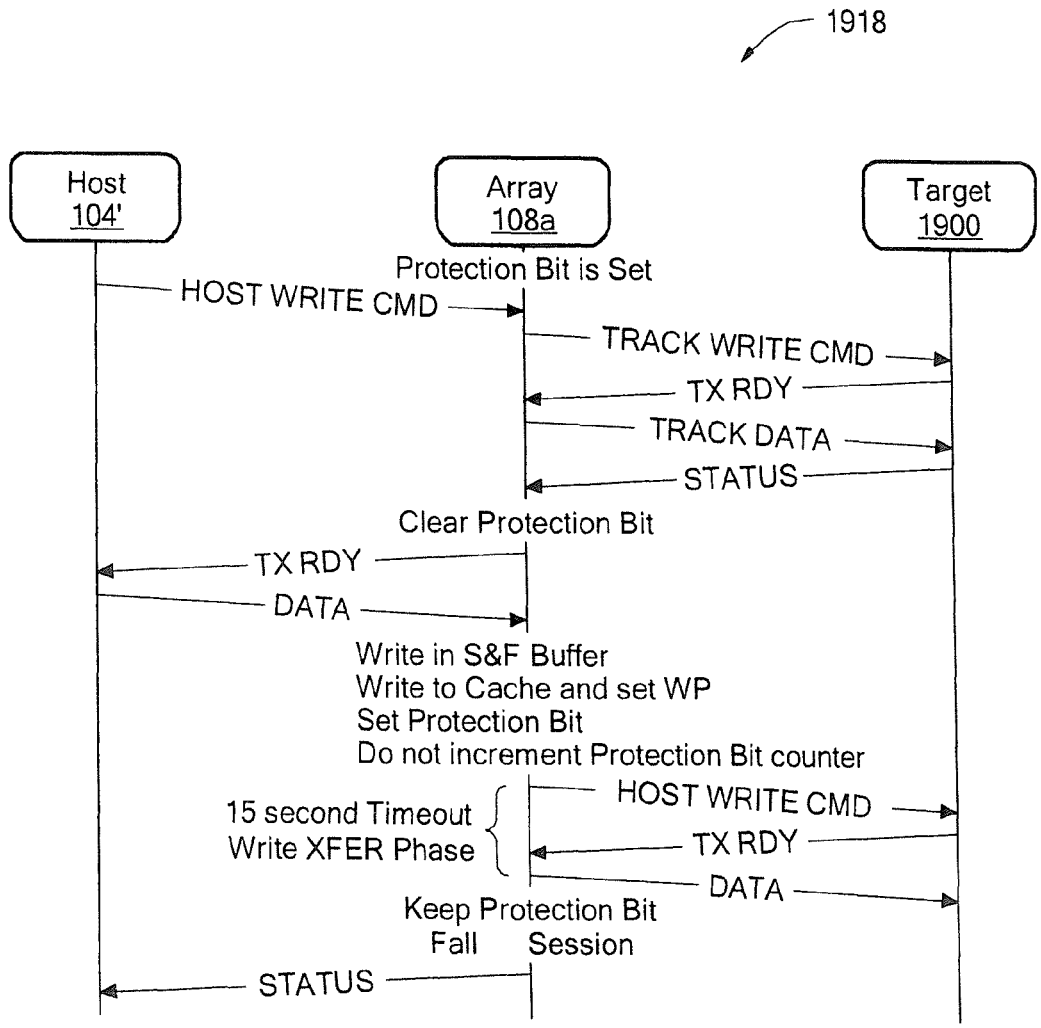

IN FIG. 19I, a process 1918 is an example of a process used when the ORS splitter 1702 in storage array 108*a* is in the SSP active state 1806 and a timeout occurs during a host write transfer. Initially, the protection bit is set. The host 104' sends a host write command (HOST WRITE CMD) to the storage array 108*a*. The ORS splitter in storage array 108*a* sends a track write command (TRACK WRITE CMD) to the target 1900 exposed by DPA, which returns a transfer ready (TX RDY) message. The ORS splitter 1702 sends track data to the target 1900 exposed by DPA 112*a*. The DPA 112*a* sends a status message to the ORS splitter 1702 in storage array 108*a*. The protection bit is cleared. The storage array 108*a* sends a transfer ready message to the host 104'. The host 104' sends the data to the storage array 108*a*. The data is written to the S&F Buffer 1706 and to the cache 1704. The protection bit is set. The ORS splitter 1702 in array 108*a* sends a host write command to the target 1900 exposed by DPA 112*a*, which sends transfer ready message to the ORS splitter 1702 in array 108*a*. The ORS splitter 1702 in array 108*a* sends data to the target 1900. If a timeout occurs during the host write transfer (e.g., after 15 seconds), the protection bit is kept and the replication session is failed, the ORS session moves to SSP tracking state 1814. The storage array 108*a* returns a status message to the host 104'.

Figure 20A:
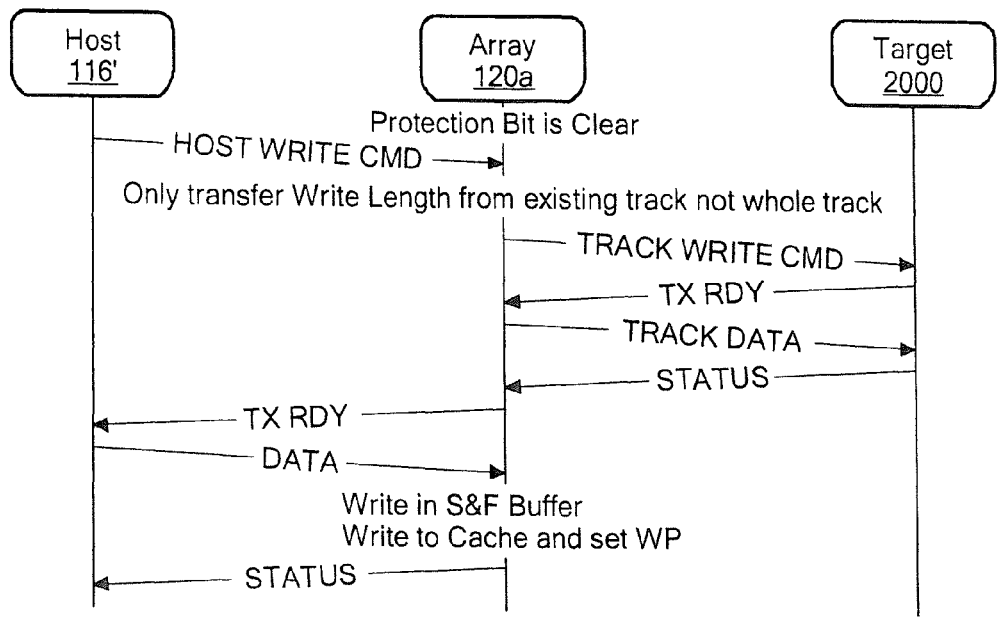
FIGS. 20A to 20B are sequence diagrams for a target side protection (TSP) active state.
Figure 20B:
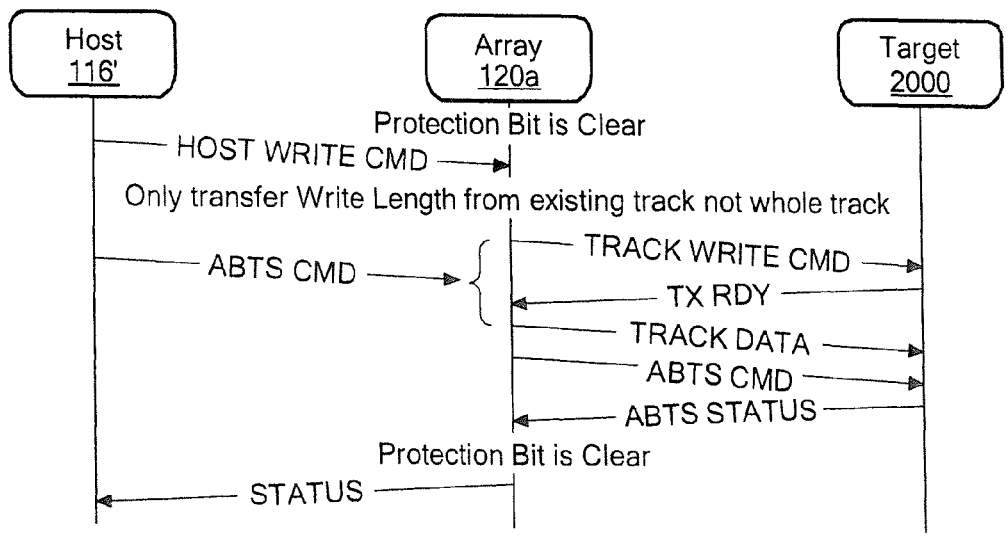

Referring to FIGS. 20A-20B, the target side (remote) storage 120 in conjunction with the host 116' and a target 1700 exposed by DPA 124*a* can perform a number of different processes (e.g., the processes 2002-2006) while the ORS splitter 1702 is in the TSP active state 1816.

Referring to FIG. 20A, a process 2002 is an example of a process used when the ORS splitter 2002 in storage array 120*a* is in the TSP active state 1816. In this case, the protection bit is always clear. In one example each storage array has its own splitter, so that there may be several arrays on each site each with its own splitter.

The host 116' sends a host write command (HOST WRITE CMD) to a volume (e.g., a volume 2012) on storage array 120*a*. The ORS splitter 2002 sends a track write command (TRACK WRITE CMD), to the target 2000 exposed by DPA 124*a*. In one example, the command is a SCSI write command with the same offset and length as the host write command but include the data which is currently on the storage volume, i.e. the data the host write command is about to overwrite. The target 2000 returns a transfer ready message to the splitter 2002. The splitter 2002 sends track data to the target 2000 the data includes the data that is currently on the volume (e.g., a volume 2012) with the same offset and size as the I/O host 116' generated (this is different than the TRACK write in SSP mode where all 64 KB of the track are sent). The target 2000 returns a status message to the ORS splitter 2002, and the storage array 120*a* returns a transfer ready message (TX RDY) to the host 116'. The host 116' then sends the data to the storage array 120 which writes the data in an S&F buffer 2006, writes to a cache 2004 and sets WP. The storage array 120' returns a status message to the host 116' that data transfer is complete.

Referring to FIG. 20B, a process 2004 is an example of a process used when the splitter 2002 is in the TSP active state 1816 and the host 116' sends an abort command. The protection bit is clear. The host 116' sends a host write command (HOST WRITE CMD) to the storage array 120*a*. The splitter 2002 sends a track write command (TRACK WRITE CMD) to the target 2000. The target 2000 returns a transfer ready message to the splitter 2002. The splitter 2002 sends track data to the target 2000, which is exposed by DPA 124*a*.

If the host 116' sends an abort command (ABTS CMD) during the track data transfer, the ORS splitter 2002 sends an abort command (ABTS CMD) to the target 2000. The target returns an abort status message to the splitter 2002. The storage array 108' then returns an abort status message to the host 116' that data transfer is complete.

Splitter Use Cases:
 Configuration:
 A consistency group (CG) is created in the DPA. A consistency group is a set of volumes which are replicated together. For all volumes in a consistency group, write order fidelity is maintained.

For all volumes on the production site of the CG, an ORS session will be created. For each volume in the CG, a volume will be exposed in the DPA. All volumes move to SSP active state and then replication will start (by a full synchronization/initialization), On the replica site an ORS session is created for any volume in the consistency group in the TSP passive state 1804. No volumes will be exposed by the DPA at creation time. When a user wants to access an image for the first time, the DPA will roll the remote volumes to the point-in-time that the user requested. Then the DPA will expose a LUN for each remote volume. The ORS session for each remote volume will move to TSP inactive state 1812 and then move to TSP active state 1816. After the first time a user accesses an image, the session will remain in either the TSP active state 1816 or TSP inactive state 1812 and will not move back to TSP passive state 1804.

Initialization:
 When the DPA consistency group is initializing, i.e., synchronizing the replication source and target volumes, it may be the case that the data according to the DPA 112*a* is synchronized, (i.e., the DPA initialization process described above is complete) but volumes are not yet really synchronized. The protection bitmap in the ORS splitter may be not empty, meaning there is still data which is not synchronized.

In order for the initialization to be completed, the DPA 112a verifies that the ORS splitter 1702 is still in SSP active state 1806 and the SSP active state 1806 is synchronized, for all volumes in the consistency group. If the SSP active state 1806 is not synchronized, the consistency group will remain in an initialization mode until the SSP active state 1806 is synchronized, because the remote volume is not consistent.

Figure 21:
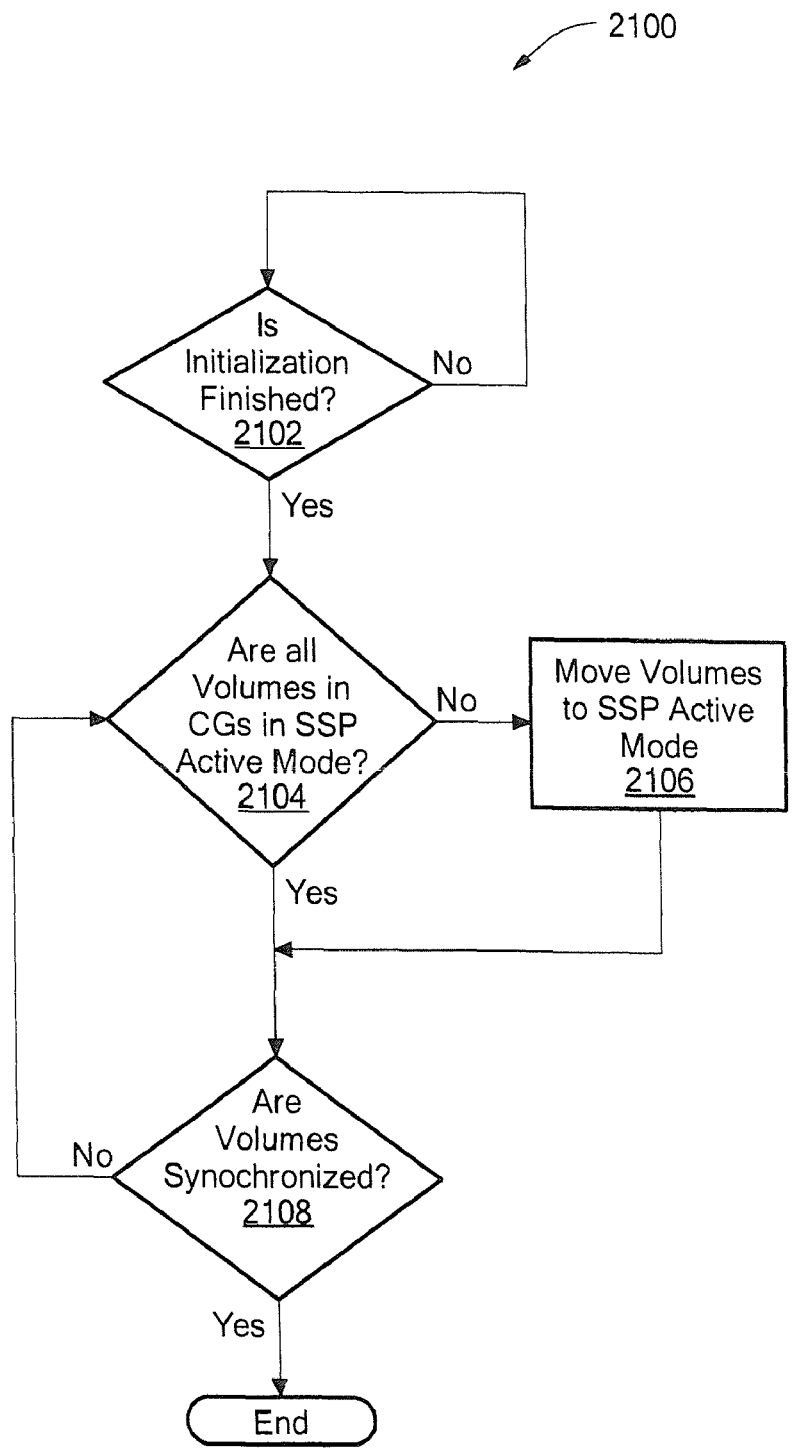
FIG. 21 is a flow diagram of an example of a process to complete initialization.

Referring to FIG. 21, an example of a process to determine that initialization is completed is a process 2100, which is executed by DPA 112a. Process 2100 determines if initialization is finished (e.g., using a process 790) (2102). If initialization is not finished process 2100 keeps checking to determine if initialization is finished. If the initialization is finished, process 2100 determines (2104) if the volumes in the consistency group are all in SSP active state 1806. If not, all volumes in the consistency group are moved (2106) to the SSP active state 1806. Process 2100 determines if the volumes are synchronized (2108) and if they are, initialization is complete.

Figure 22:
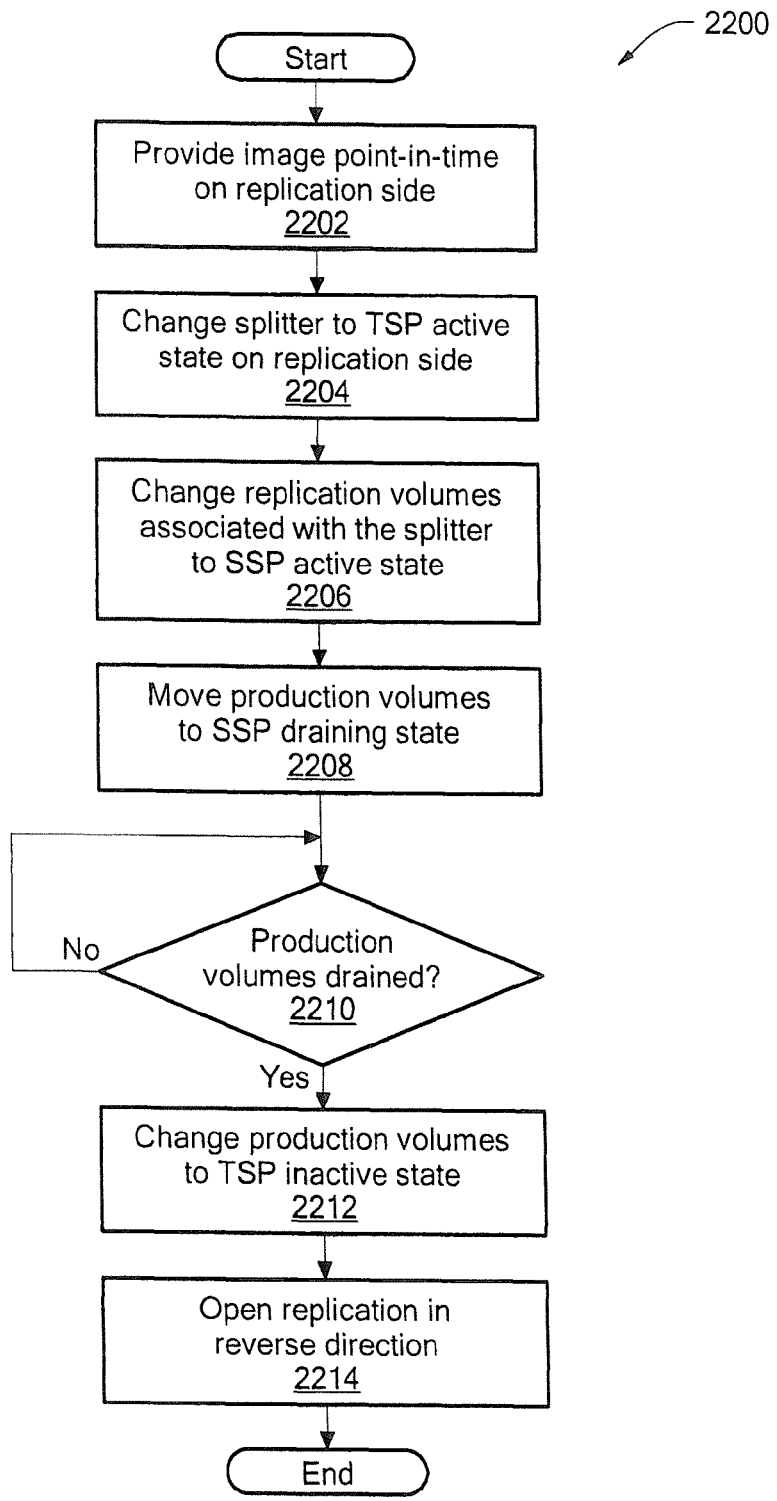
FIG. 22 is a flow diagram of an example of a process to perform a failover.

Failover:

Referring to FIG. 22, one example of a process used in failover is a process 2200. When a user wants to failover, the user requests to access a point-in-time image. The point-in-time image is provided to the user (2202) and the ORS splitter 2002 will move to the TSP active state 1816 (2204). When the user decides to failover, the ORS session on the old target site will move to SSP active state 1806 (2206). The DPA will lose the journal data and track all the changes in the delta marking stream. When ORS sessions of all volumes move to SSP active state 1806 the replication direction can change.

Before starting replication at another site, the old production site moves from SSP active state 1806 to TSP inactive state 1812 (2212) (by transitioning through the SSP draining state 1808 (2208) because in the TSP inactive state, all bits in the protection bitmap must be cleared).

In the SSP draining state 1808, the host 104' cannot send anymore I/Os to the storage array 108a. The background process is finished pushing all the dirty locations from the protection bitmap to the DPA volume 112a. Process 2200 determines if the production volumes have been drained by pushing all the dirty locations (2210). When all dirty locations are pushed, the splitter 1702 can move to TSP inactive state 1812, where the states of all the volumes of the storage array 108a are in TSP inactive state 1812.

When all volumes on the old production site are in TSP inactive state 1812 and all volumes in the old replication site are in SSP active state 1806, replication can start in the reverse direction (2214).

Figure 23:
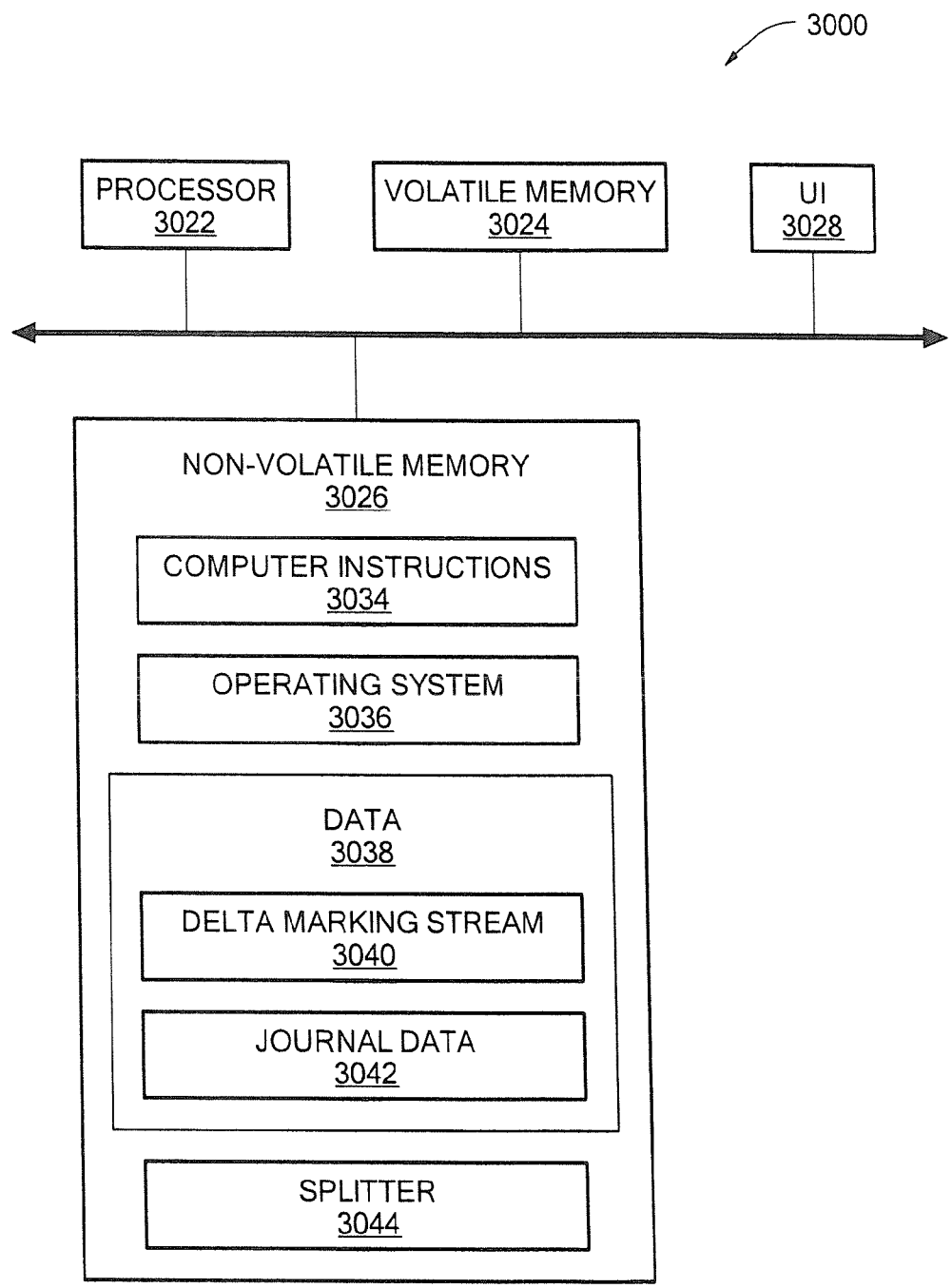
FIG. 23 is a computer on which any of the processes of FIGS. 19A to 19I, 20A to 20B, 21 and 22 may be implemented.

Referring to FIG. 23, a computer 3000 includes a processor 3022, a volatile memory 3024, a non-volatile memory 3026 (e.g., hard disk) and a user interface (UI) 3028 (e.g., a mouse, a keyboard, a display, touch screen and so forth). The non-volatile memory 3026 stores computer instructions 3034, an operating system 3036 and data 3038 including a delta marking stream 3040 and journal data 3042. The non-volatile memory also includes a splitter 3044 (e.g., the splitter 1702 or the splitter 2002). In one example, the computer instructions 3034 are executed by the processor 3022 out of volatile memory 3024 to perform all or part of the processes described herein (e.g., processes 1902-1918, 2002-2004, 2100 and 2200).

The processes described herein (e.g., the processes 1902-1918, 2002-2004, 2100 and 2200) are not limited to use with the hardware and software of FIG. 23; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the processes described herein. The processes described herein may also be implemented as a machine-readable storage medium, configured with a computer program, where upon execution, instructions in the computer program cause the computer to operate in accordance with the processes.

The processes described herein are not limited to the specific examples described. For example, the processes 1902-1918, 2002-2004, 2100 and 2200 are not limited to the specific processing order of FIGS. 19A-19I, 20A-20B, 21 and 22, respectively. Rather, any of the processing steps of FIGS. 19A-19I, 20A-20B, 21 and 22 may be re-ordered, combined or removed, performed in parallel or in serial, as necessary, to achieve the results set forth above.

The processing blocks in FIGS. 19A-19I, 20A-20B, 21 and 22 associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method, comprising:
providing a first splitter at a first storage array;
receiving data from a host;
storing the data on the first storage array;
using a data protection appliance (DPA) to expose a device;
continuously copying data stored on the first storage array to the device using the first splitter; and
replicating the data to a second storage array using the DPA, wherein providing the first splitter at the first storage array comprises providing a splitter configured to transition through a plurality of states, and
wherein the plurality of states comprises:
a source side processing (SSP) active state;
a SSP tracking state;
a SSP draining state;
a SSP failed state;
a target side processing (TSP) passive state;
a TSP inactive state; and
a TSP active state.

2. The method of claim 1, further comprising determining if initialization is complete comprising:
determine if an initialization process is finished;
determine if volumes in a consistency group on the first storage array are in the SSP active state;
changing a state of the volumes on the first storage array to the SSP active state if the volumes are not in the SSP active state; and
completing the initialization if the volumes on the first storage array are synchronized.

3. The method of claim 1, further comprising performing a failover comprising:
changing a state of a second splitter on the second storage array to the TSP active state; and
changing volumes on the second storage array associated with the second splitter to the SSP active state;
change a state of volumes on the first storage array to the SSP draining state; and
change the volumes on the first storage array from the SSP draining state to the TSP inactive state if the volumes on the first storage array have been drained; and
starting replication in a reverse direction,
wherein the volumes on the first storage array are drained by moving I/Os that are determined to be dirty in a protection bitmap.

4. The method of claim 1, further comprising:
in the SSP active state and a replication mode is synchronous:
retrying transferring an I/O for a period of time;
on every I/O error during the period of time, retrying to discover the device; and
after the period of time move to the SS tracking state.

5. The method of claim 1, further comprising moving from the SSP active state to the SSP tracking state if a host aborts an I/O transfer.

6. The method of claim 1, further comprising, in SSP active mode with replication mode asynchronous, changing from the SSP active state to the SSP tracking state on an I/O failure.

7. The method of claim 1, further comprising, in the TSP active state:
on every I/O failure, returning the I/O failure to the host; and
rediscovering the device exposed by the DPA.

8. The method of claim 1, further comprising:
discovering the device; and
changing to the SSP active state if the device exists.

9. The method of claim 1, wherein the first splitter comprises a protection bitmap, which includes a bit for every track.

10. The method of claim 1, further comprising:
rediscovering a path to the device after the connection with the device is lost;
changing from the SSP failed state to the SSP draining state if the path to the device is found; and
remaining in the SSP failed state if the path to the device is not found.

11. The method of claim 1, further comprising:
rediscovering a path to the device after the connection with the device is lost;
changing from the SSP tracking state to the SSP active state if the path to the device is found; and
remaining in the SSP tracking state if the path to the device is not found.

12. The method of claim 1, further comprising, in the SSP tracking state, setting a relevant bit to 1 in a protection bitmap if an I/O arrives to track.

13. The method of claim 1, further comprising setting a mode to a synchronized mode if all bits in a protection bitmap are 0, otherwise if in the SSP active state or the SSP draining state, run a background process which push the data.

14. The method of claim 1, further comprising in an TSP mode, for every write I/O, read data in the device, push to the DPA and accept I/Os from the host.

15. The method of claim 1, further comprising changing dynamically from the TSP active state to the SSP active state while servicing I/Os.

16. The method of claim 1, further comprising, in the SSP active state if a bit is set in a protection bitmap, push track data to the DPA before handling an I/O.

17. An article comprising:
a non-transitory machine-readable medium that stores executable instructions, the instructions causing a machine to:
provide a splitter configured to transition through a plurality of states at a first storage array;
receive data from a host;
store the data on the first storage array;
use a data protection appliance (DPA) to expose a device;
continuously copy data stored on the first storage array to the device using the splitter; and
replicate the data to a second storage array using the DPA,
wherein the plurality of states comprises a source side processing (SSP) active state, a SSP tracking state, a SSP draining state, a SSP failed state, a target side processing (TSP) passive state, a TSP inactive state and a TSP active state.

18. An apparatus, comprising:
circuitry to:
provide a splitter configured to transition through a plurality of states at a first storage array;
receive data from a host;
store the data on the first storage array;
use a data protection appliance (DPA) to expose a device;
continuously copy data stored on the first storage array to the device using the splitter; and
replicate the data to a second storage array using the DPA,
wherein the plurality of states comprises a source side processing (SSP) active state, a SSP tracking state, a SSP draining state, a SSP failed state, a target side processing (TSP) passive state, a TSP inactive state and a TSP active state.

19. The apparatus of claim 18 wherein the circuitry comprises at least one of a processor, a memory, programmable logic and logic gates.

* * * * *

UNITED STATES PATENT AND TRADEMARK OFFICE
CERTIFICATE OF CORRECTION

| | | |
|---|---|---|
| PATENT NO. | : 8,332,687 B1 | Page 1 of 1 |
| APPLICATION NO. | : 12/821418 | |
| DATED | : December 11, 2012 | |
| INVENTOR(S) | : Assaf Natanzon et al. | |

It is certified that error appears in the above-identified patent and that said Letters Patent is hereby corrected as shown below:

On the title page, item (75) Arich Don should be corrected to read Arieh Don.

Signed and Sealed this
Twenty-ninth Day of January, 2013

David J. Kappos
*Director of the United States Patent and Trademark Office*